（12） United States Patent
Persson et al.

(10) Patent No.: US 9,619,937 B2
(45) Date of Patent: Apr. 11, 2017

(54) METHODS AND APPARATUS FOR PROCESSING COMPUTER GRAPHICS PRIMITIVES IN TILE-BASED GRAPHICS RENDERING SYSTEM

(71) Applicant: ARM Limited, Cambridge (GB)

(72) Inventors: Hakan Persson, Bjarred (SE); David Shreiner, Mountain View, CA (US)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 14/639,346

(22) Filed: Mar. 5, 2015

(65) Prior Publication Data

US 2016/0260249 A1 Sep. 8, 2016

(51) Int. Cl.
| G06T 17/10 | (2006.01) |
| G06K 9/62 | (2006.01) |
| G06T 1/20 | (2006.01) |
| G06T 1/60 | (2006.01) |
| G06T 7/00 | (2017.01) |
| G06T 11/40 | (2006.01) |
| G06T 15/00 | (2011.01) |
| G06T 7/50 | (2017.01) |

(52) U.S. Cl.
CPC ............ *G06T 17/10* (2013.01); *G06K 9/6267* (2013.01); *G06T 1/20* (2013.01); *G06T 1/60* (2013.01); *G06T 7/0051* (2013.01); *G06T 7/50* (2017.01); *G06T 11/40* (2013.01); *G06T 15/005* (2013.01)

(58) Field of Classification Search
None
See application file for complete search history.

(56) References Cited

U.S. PATENT DOCUMENTS

| 2011/0304608 A1* | 12/2011 | Yang ............... G06T 15/005 345/419 |
| 2013/0293544 A1* | 11/2013 | Schreyer ........... G06T 15/005 345/426 |

OTHER PUBLICATIONS

Molnar et al., "A Sorting Classification of Parallel Rendering", IEEE Computer Graphics and Applications, 14(4):23-32, 1994.
Nouanesengsy et al., "Revisiting Parallel Rendering for Shared Memory Machines", Eurographics Symposium on Parallel Graphics and Visualization, 2011.
Mueller, "The Sort-First Rendering Architecture for High-Performance Graphics", In Proceedings of the 1995 Symposium on Interactive 3D Graphics (1995), ACM Press, pp. 75-84.
Samanta et al., "Hybrid Sort-First and Sort-Last Parallel Rendering with a Cluster of PCs", HWWS '00: Proceedings of the ACM SIGGRAPH/EUROGRAPHICS workshop on Graphics hardware (New York, NY, USA, 2000), ACM, pp. 97-108.

(Continued)

*Primary Examiner* — Edward Martello
(74) *Attorney, Agent, or Firm* — Vierra Magen Marcus LLP

(57) ABSTRACT

An apparatus for processing primitives in a tile-based graphics processing system includes processing circuitry which is configured to determine, for a group of plural primitives, the rendering tiles that the group of primitives should be processed for. The processing circuitry is also configured to store, for the group of primitives, a data entry containing an indication of the identity of the plurality of primitives in the group of primitives, and an indication of the rendering tiles that it has been determined the group of primitives should be processed for.

23 Claims, 9 Drawing Sheets

(56) References Cited

OTHER PUBLICATIONS

Torborg et al., "Talisman: Commodity Realtime 3D Graphics for the PC", In Proceedings of the 23rd Annual Conference on Computer Graphics and Interactive Techniques (SIGGRAPH '96), (New York, NY, USA, 1996), ACM, pp. 353-363.
Annex to Form PCT/ISA/206 Communication Relating to the Results of the Partial International Search dated Jun. 24, 2016 in International Patent Application No. PCT/GB2016/050576, 9 pages.
Rudrajit Samanta and Thomas Funkhouser: "Dynamic Algorithms for Sorting PrimitivesAmong Screen-Space Tiles in a Parallel Rendering System", Princeton University; web.archive.org Aug. 31, 2000 (Aug. 31, 2000), XP0O2758363, Retrieved from the Internet: URL :http://web.archive.org/web/20000101000000* /http :// www.cs.princeton.edu/~funk/sorting.pdf, 12 pages.
Tomas Akenine-Moller et al : "Real-Time Rendering Third Edition", 2008, A K Peters, Ltd.Natick, Massachusetts, XP002758364, p. 662, pgph. 1-3; p. 663, pgph.4-p. 664, pgph.I; fig. 14.11, 6 pages.
Jun-Seo Kim et al: "A hierarchical tiling algorithm for tile based rendering with Global Scratch Counter under multi core environment", TENCON 2011—2011 IEEE Region 10 Conference, IEEE, Nov. 21, 2011 (Nov. 21, 2011), pp. 197-200, XP032O92487, DOI: 10.1109/TENCON.2011.6129091 ISBN: 978-1-4577-0256-3 p. 197, left, pgph.2; p. 198, right, pgph.2, 4 pages.

* cited by examiner

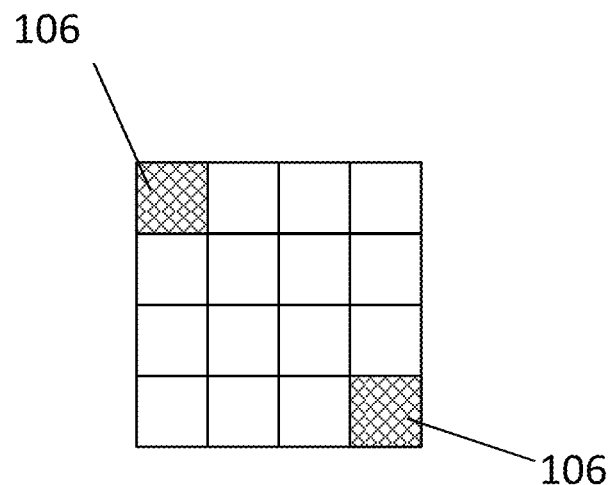
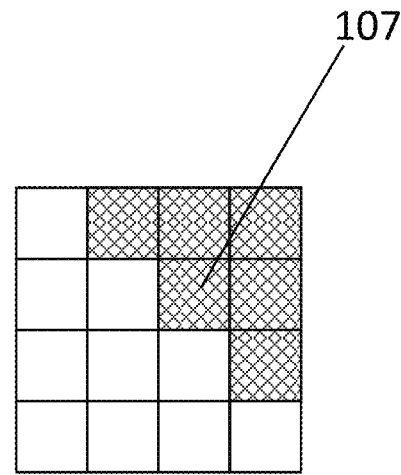
Fig. 3a                Fig. 3b
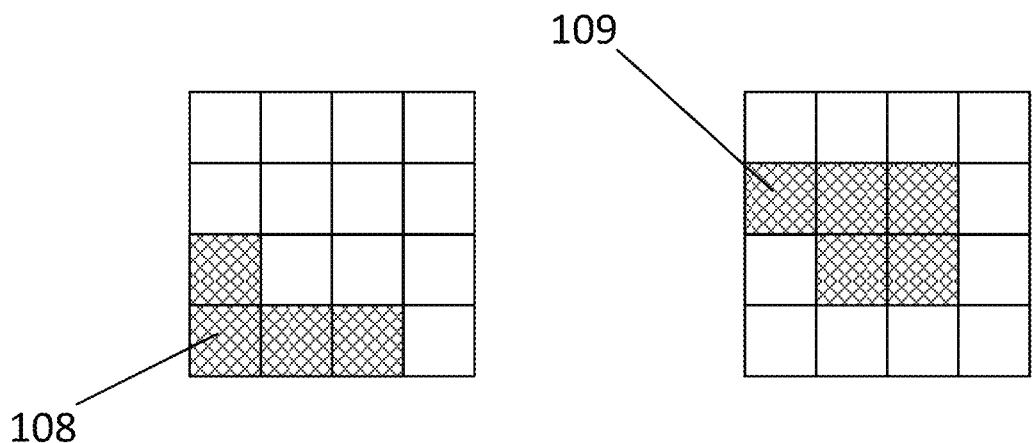
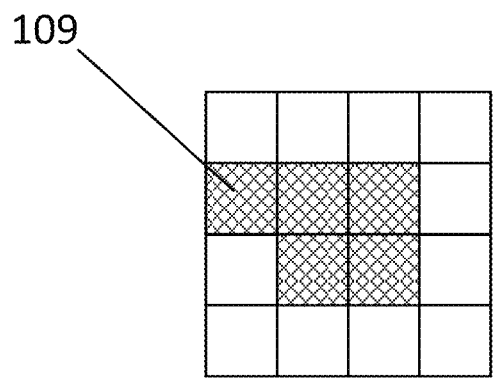
Fig. 3c                Fig. 3d

METHODS AND APPARATUS FOR PROCESSING COMPUTER GRAPHICS PRIMITIVES IN TILE-BASED GRAPHICS RENDERING SYSTEM

BACKGROUND

The technology described herein to a method of and apparatus for processing computer graphics, and in particular to such a method and apparatus for use in a tile-based graphics processing system.

As is known in the art, graphics processing is normally carried out by first splitting the scene to be displayed into a number of similar basic components or "primitives", which primitives are then subjected to the desired graphics processing operations. The graphics "primitives" are usually in the form of simple polygons, such as triangles, and are usually described by defining their vertices.

FIG. 1 is a flow chart which shows a selected few steps performed in a conventional graphics processing system to render an output. First the geometry (the primitives) to be processed is defined in a three dimensional "user" space (step 1, "Geometry processing") and then it is transformed into a two dimensional "screen" space, i.e. from the viewpoint of the viewer of the display (step 2, "Transformed geometry").

Many graphics processing systems use so-called "tile-based" rendering. In tile-based rendering, the two-dimensional render output or target (i.e. the screen space output of the rendering process, such as an output frame to be displayed) is rendered as a plurality of smaller area sub-regions, usually referred to as "tiles". The tiles are each rendered separately (for example one-after-another). The rendered tiles are then recombined to provide the complete rendering output (e.g. frame for display). In such arrangements, the render target (output) is typically divided (by area) into regularly-sized and shaped rendering tiles (they are usually e.g., squares or rectangles) but this is not essential.

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.

FIG. 2 shows an exemplary rendering output 101 (e.g. frame for display) that is divided into a 4 by 4 array of square tiles, i.e. 16 tiles in total. Arranged within the rendering output 101 are two primitives 102, 103 (the transformed geometry in screen space). The primitives 102, 103 each cover a respective tile 104, 105 completely and a number of surrounding tiles partially. The primitives 102, 103 also overlap each other with the primitive 102 that is closer to the viewer being displayed in front of the other primitive 103. (Although it cannot be seen from the two dimensions of the rendering output 101, as defined in the three dimensional user space, the primitives 102, 103 also have a depth range that they span.)

As shown in FIG. 1, in a tile-based rendering system, the transformed geometry (primitives, e.g. the primitives 102, 103 shown in FIG. 2) for the render target is sorted into the tiles that the rendering process operates on (step 3, "Tiling").

The tiling process identifies those primitives that are actually present in a given rendering tile (so as to, e.g., avoid unnecessarily rendering primitives that are not actually present in a tile). In conventional tiling systems, this tiling process produces for each rendering tile a list of the primitives to be rendered for that rendering tile (e.g. that will appear in the tile) (step 4, "Triangle lists per tile"). Such a "primitive-list" (which can also be referred to as a "tile list") identifies (e.g. by reference to a primitive indicator) the primitives to be rendered for the tile in question.

FIGS. 3a, 3b, 3c and 3d show, for the example shown in FIG. 2, the result of the tiling process, i.e. the identification of which primitives are present in the tile, for the rendering output 101. As shown in FIG. 3a, there are some tiles 106 which do not contain any primitives. As shown in FIG. 3b, there are some tiles 107 which are contain only the front primitive 102. As shown in FIG. 3c there are some tiles 108 which contain only the rear primitive 103. As shown in FIG. 3d there are some tiles 109 which contain both primitives 102, 103. From this identification of the different primitives (or lack thereof) in the different tiles, a primitive list can be produced for each tile.

The lists of primitives (the tile lists) are then used to identify the primitives to be rendered for each tile (and the primitives in question are then rendered (step 5, "Fragment processing")).

The Applicants believe that there remains scope for improvements to the processing of primitives in tile-based graphics processing systems.

BRIEF DESCRIPTION OF THE DRAWINGS

A number of embodiments of the technology described herein will now be described by way of example only and with reference to the accompanying drawings, in which:

FIGS. 3a, 3b, 3c and 3d illustrate the tiling process for the rendering output shown in FIG. 2;

Like reference numerals are used for like components where appropriate in the drawings.

DETAILED DESCRIPTION

Figure 1:
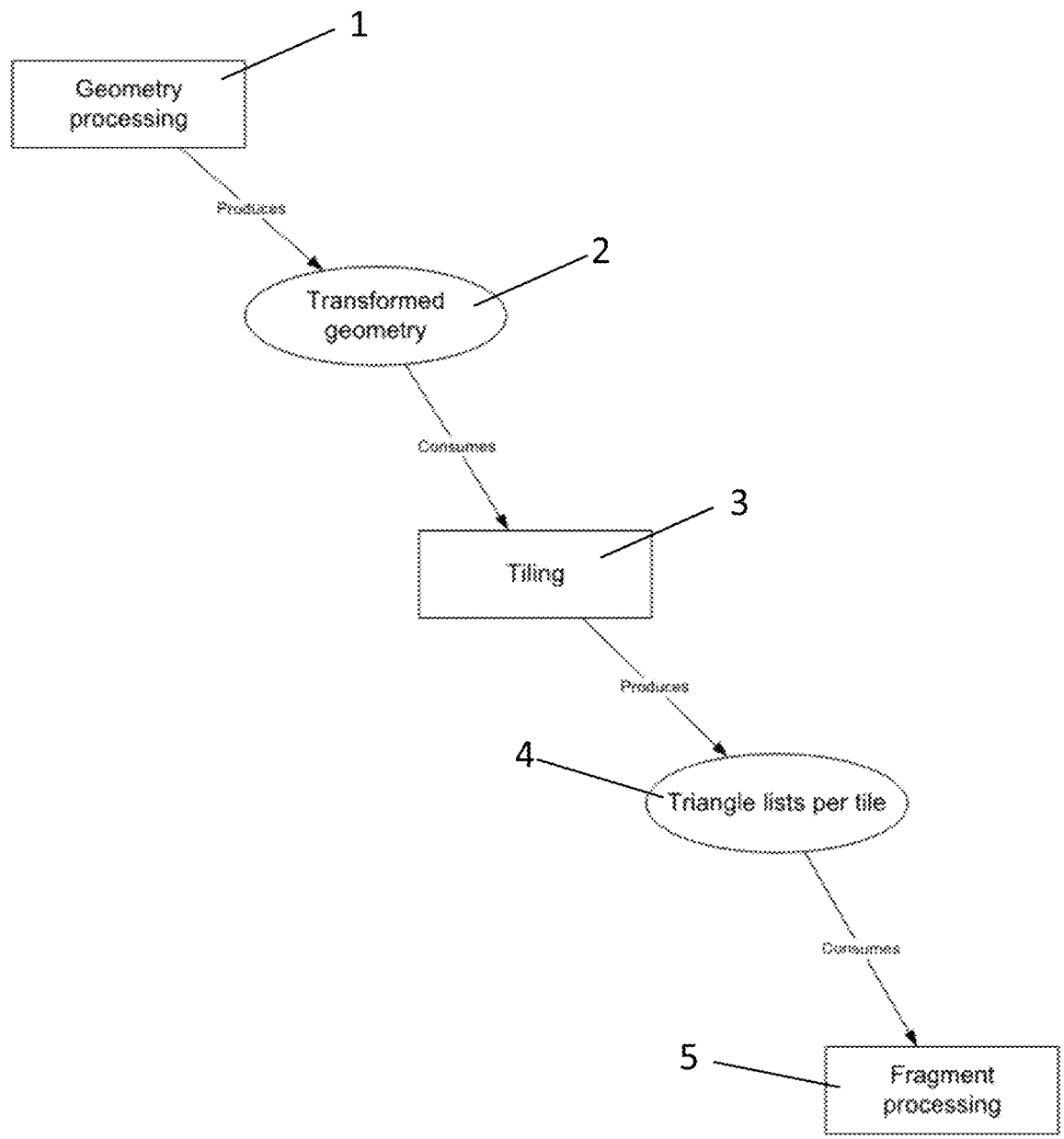
FIG. 1 is a flow chart which shows some of the steps performed in a conventional tile-based graphics processing system to render a frame.
Figure 2:
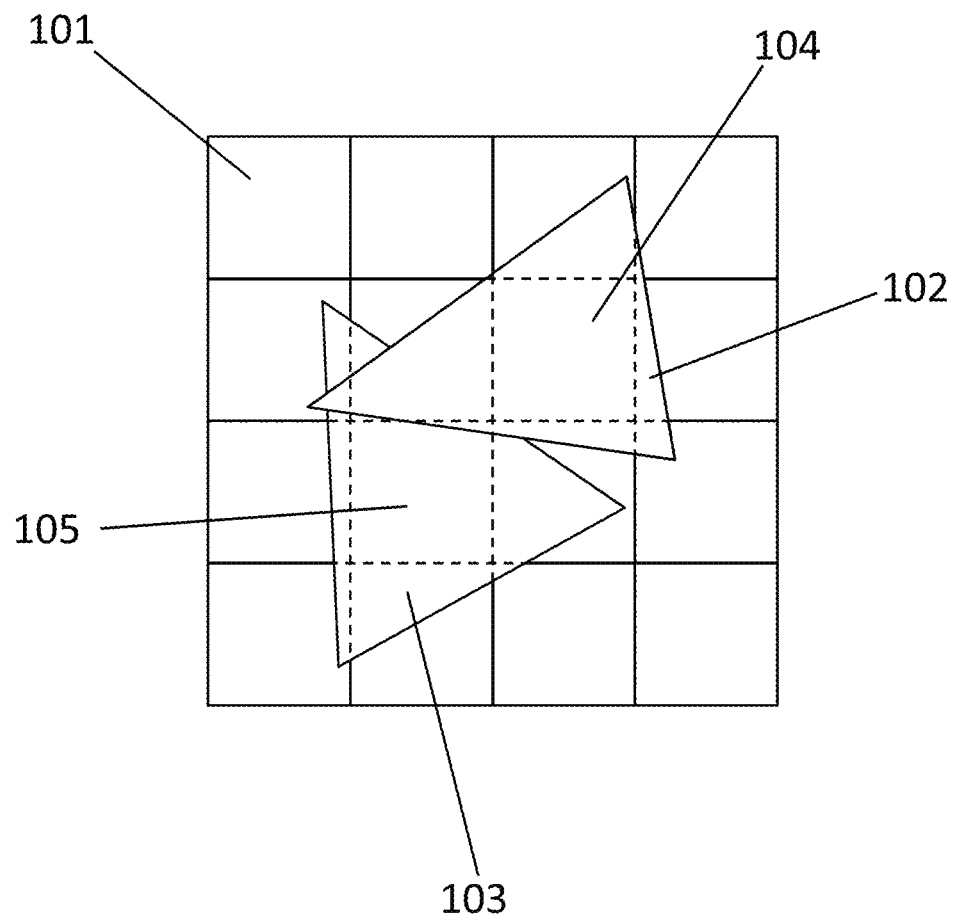
FIG. 2 shows a tiled rendering output containing primitives to be rendered.

One embodiment of the technology described herein comprises a method of processing primitives in a tile-based graphics processing system, the method comprising:

for a group of plural primitives to be rendered:

determining, for the group of primitives, the rendering tiles that the group of primitives should be processed for; and storing, for the group of primitives, a data entry comprising an indication of the identity of the plurality of primitives in the group of primitives, and an indication of the rendering tiles that it has been determined the group of primitives should be processed for.

Another embodiment of the technology described herein comprises an apparatus for processing primitives in a tile-based graphics processing system, the apparatus comprising processing circuitry configured to:

for a group of plural primitives to be rendered:

determine, for the group of primitives, the rendering tiles that the group of primitives should be processed for; and store, for the group of primitives, a data entry comprising an indication of the identity of the plurality of primitives in the group of primitives, and an indication of the rendering tiles that it has been determined the group of primitives should be processed for.

The technology described herein relates to a tile-based graphics processing system. In the technology described herein, for a given group of primitives to be rendered, a primitive group data entry is created for the group of primitives as a whole, in which an indication of the primitives in the group, e.g. as a list, as well as an indication of the tiles which the primitives in the group should be processed for (e.g. in which the group of primitives (at least partially) falls) are stored.

The grouping of the information in the per-group data entry can allow more efficient rendering of the primitives. This is because the information in the per-group data entry can be a summary, held at a higher level, of the plurality of primitives in the group of primitives, which can then be used to more efficiently process the primitives, as will be outlined in more detail below.

Storing the information at a higher level, i.e. the data entry for the group of primitives, means that this information does not need to be (and e.g. is not) duplicated multiple times at a lower level, i.e. at a per-primitive level. This reduces the storage space requirements for the information relating to the primitives, and also the bandwidth needed in the system to process this information during rendering. This is particularly important when features that expand the geometry, and thus the number of primitives, are being used, e.g. tessellation or a geometry shader, which consequently create an increased amount of information to be processed. Thus more primitives can be processed for the same amount of storage and bandwidth availability.

Thus the technology described herein comprises methods and apparatus for the creation of data structures which allow the rendering of a plurality of primitives to be performed more efficiently, and which can be used to accelerate downstream stages of the rendering pipeline.

The tiles that the graphics processing output (render target, e.g. frame for display) is divided into for rendering purposes can be any desired and suitable size and shape. In an embodiment the tiles are all the same size and shape, although this is not essential. In an embodiment each tile is rectangular (including square), and in an embodiment 8×8, 16×16, 32×32, 32×4 or 32×1 sampling positions in size. It should be noted that this list is not limiting and each tile may be larger, for example, than these examples given.

The rendering tiles that the group of primitives should be processed for can be determined in any suitable and desired manner and the indication of the rendering tiles that it has been determined the group of primitives should be processed for can comprise any suitable and desired information. In an embodiment the method comprises (and the processing circuitry is configured to) determining the rendering tiles that the group of primitives extends over; and storing, for the group of primitives, a data entry comprising an indication of the rendering tiles that it has been determined the group of primitives extends over.

The rendering tiles that the group of primitives extends over can be determined in any suitable and desired manner. This should identify all the rendering tiles that at least one primitive of the group of primitives falls at least partially within, i.e. include any rendering tile that is at least partially intersected by at least one primitive of the group of plural primitives. In an embodiment, this is done by generating a bounding box for the group of primitives, and then determining which rendering tiles the bounding box falls, at least partially, within. It would also be possible to use an exact binning process for this, if desired. This could also or instead use information determined and, e.g. stored, for other primitives and groups of primitives, whether for the same or a previous render output, for example.

The rendering tiles that the group of primitives should be processed for may be determined (and stored) at any suitable and desired stage in the processing of the group of primitives. In one embodiment the rendering tiles that the group of primitives should be processed for is determined after the geometry of the individual primitives has been transformed from user space (the coordinate system in which the primitives are initially defined) to screen space (the coordinate system of the tiles and the render output). In this embodiment the transformed geometry of the primitives is therefore able to be used, e.g. among other pieces of information, to determine the rendering tiles that the group of primitives should be processed for.

However, the Applicant has appreciated that it may not be necessary to transform the geometry of the individual primitives in the group of primitives to be able to determine which rendering tiles the group of primitives should be processed for, i.e. the determination may be able to be made based on a reduced amount of transformed geometry information, e.g. at the level of the group of primitives. This may allow the initial amount of processing which needs to be performed to be reduced. More detailed processing, e.g. transforming the geometry of the individual primitives, can be performed later when this is needed. For example, the reduced amount of transformed geometry information may indicate that the group of primitives should be processed for none of the rendering tiles, in which case the group of primitives can be discarded, i.e. not processed any further, without having to transform the geometry of each of the primitives individually.

Thus, in another embodiment, not all, and in an embodiment none of, the primitives in the group of primitives are transformed from user space to screen space before the rendering tiles that the group of primitives should be processed for is determined. For example only a subset of the plurality of primitives could be transformed from user space to screen space before determining the rendering tiles that the group of primitives should be processed for, and/or geometry representative of the group of primitives such as, and in an embodiment, a bounding box for the group of primitives, could be transformed from user space to screen space before determining the rendering tiles that the group of primitives should be processed for. In an embodiment the geometry (e.g. primitive subset or bounding box) that is transformed from user space to screen space comprises the minimum geometry necessary to determine the rendering tiles that the group of primitives should be processed for, e.g. a bounding box for the group of primitives.

In this embodiment, when the transformed geometry indicates that the group of primitives should be processed for at least some of the rendering tiles, for example, the geometry of the individual primitives may then be (and in an embodiment is) transformed in order to determine the rendering tiles that the individual primitives should be processed for. This may allow more detailed culling of the individual primitives in the group of primitives which are not to be processed for any of the rendering tiles.

As well as storing data for the group of primitives, the Applicants have recognised that it may be useful to (determine and) store for each individual primitive of the plurality of primitives information that can be used to determine whether or not to process the primitive, i.e. in addition to determining and storing information at the level of the group of primitives. In one embodiment the method therefore comprises the steps of (and the processing circuitry is configured to):

storing, for each primitive of the plurality of primitives (in the group of primitives), a data entry comprising information that can be used to determine whether to process the primitive or not.

Thus, in an embodiment, for a given group of primitives to be rendered, in addition to storing a data entry for the group of primitives as a whole, a second, per-primitive, data entry is created for each primitive.

In other words, in embodiments of the technology described herein, information relating to the primitives is stored at multiple levels in a hierarchical structure.

The information stored in the data entry, for each primitive of the plurality of primitives, may comprise any suitable and desired information that can be used to determine whether to process the primitive or not.

In one embodiment the information stored in the data entry, for each primitive of the plurality of primitives, comprises an indication of the direction the primitive is facing. In an embodiment the indication comprises normal information for the primitive. The normal information is an indication of the direction of the normal to the plane of the primitive and thus which direction a primitive is facing. This may therefore be used to determine whether or not a primitive will be visible in screen space and thus should be processed or not (i.e. whether it is forward-facing or backward-facing). The normal information may be stored, e.g., as a vector or as an entry in one of a number of bins, with each bin representing a range of solid angles, for example.

It will be appreciated that storing, in a data entry, an indication of the direction each primitive is facing does not necessarily first require the rendering tiles that each of the primitives should be processed for to be determined. Furthermore, as will be explained in more detail later, with reference to the use of the data entries during processing (or not) of the primitives, it does not require that all the geometry of the individual primitives is transformed, in order for the indication of the direction each primitive is facing to be stored in the data entry.

Thus, as well as the embodiment in which not all the geometry associated with the group of primitives is transformed from user space to screen space before the rendering tiles that the group of primitives should be processed for is determined, there exists an embodiment in which not all the geometry associated with the a given primitive in the group of primitives is transformed from user space to screen space before a data entry, for each primitive of the plurality of primitives, comprising information that can be used to determine whether to process the primitive or not, is stored.

In another embodiment the data entry comprising information that can be used to determine whether to process the primitive or not also or instead comprises an indication of the tiles that the primitive should be processed for (e.g. in which the primitive (at least partially) falls). This information may be, and is in an embodiment stored after the (full) geometry of the individual primitives has been transformed from user space to screen space. In an embodiment the method comprises the steps of (and the processing circuitry is configured to):

determining, for each primitive of the plurality of primitives, the rendering tiles that the primitive should be processed for; and storing, for each primitive of the plurality of primitives, a data entry comprising an indication of the rendering tiles that it has been determined the primitive should be processed for.

In this embodiment, the rendering tiles that a primitive should be processed for can be determined in any suitable and desired manner, e.g. in a similar manner to that used for determining the rendering tiles that the group of primitives should be processed for. In an embodiment, this is done by generating a bounding box for the primitive, and then determining which rendering tiles the bounding box falls, at least partially, within. It would also be possible to use an exact binning process for this, if desired. This could also or instead use information determined and, e.g. stored, for other primitives and groups of primitives, whether for the same or a previous render output, for example.

Where individual sets of rendering tiles that should be processed for each individual primitive are determined, then these could be combined appropriately to provide a set of rendering tiles that the group of primitives extends over, i.e. the rendering tiles that the group of primitives should be processed for may be determined from the determination of the rendering tiles that should be processed for each individual primitive, e.g. in the embodiment in which the geometry of the individual primitives is transformed before such information is determined. Other arrangements would, of course, be possible.

The indication of the rendering tile or tiles that each primitive, or that the plurality of primitives, should be processed for, i.e. the mapping of the primitives to the tiles they (at least partially) fall within, can take any desired and suitable form. This may indicate explicitly the tiles that the primitive(s) should be processed for, or may, e.g., be another representation from which the tiles that the primitive(s) should be processed for can be derived, such as an indication of the area that the primitive(s) extends over.

In one embodiment the indication comprises a bitmap of the tiles that a primitive should be processed for (at least partially falls within) (e.g. for storing for the per-primitive data entries), or of the tiles that the plurality of primitives extends over (at least partially falls within) (e.g. for storing for the per-group data entry).

In another embodiment the indications comprise a bounding box for the primitive or group of primitives, e.g. defined by the top left and bottom right coordinates of a bounding box. As will be appreciated, very little information is needed in order to store the coordinates of a bounding box.

In this arrangement, the bounding box could, e.g., be defined in terms of, e.g., screen space coordinates, but in an embodiment is defined in terms of tile positions (coordinates) and/or defined sub-tile positions (coordinates).

Alternatively, and particularly in the embodiment in which not all the geometry of the individual primitives is transformed from user to screen space before the bounding box is determined, the bounding box may be defined in user space and then the geometry of the bounding box transformed into screen space to determine its coordinates as appropriate, i.e. rather than the geometry for the group of primitives (and/or the individual primitives which the group comprises) being transformed first and then the bounding box being defined.

When the bounding box is first defined in user space and then transformed into screen space, in an embodiment the geometry transform used is affine. Thus when a draw call, for example, uses an affine geometry transformation, it may not be necessary to transform the geometry of all of the primitives affected by the draw call in order to define the bounding box(es) for the group(s) of primitives.

A bounding box is a particularly convenient representation for the tiles that a primitive or group of primitives should be processed for because, when a primitive or group of primitives is related to a primitive or group of primitives in a previous frame through an affine transformation, the same transformation can be used on the bounding box indicating the tiles that the primitive falls within, such that this can then be used in the next frame to determine which tiles the primitive(s) covers in the next frame without the need to tile the primitive(s) itself.

A combination of these embodiments may be used e.g. in which the indication comprises a bounding box together with a (smaller) bitmap (e.g. 4×4) indicating the position of the primitive within the bounding box.

The coordinates used for the indications may be quantised, thus reducing the size of the data needed for their storage. Likewise, the normal information stored for each primitive may be quantised, e.g., by storing it as an entry in one of a number of bins, each bin representing a range of solid angles, for example.

The indications of the rendering tiles, e.g. a bounding box and/or a bitmap, may simply be an indication of which rendering tiles the primitive(s) at least partially covers. However in an embodiment the indications indicate which tiles are completely covered by the primitive(s) and which tiles are only partially covered by the primitive(s), thus giving a finer level of detail for the rendering of the primitives. The indication of which tiles are completely or partially covered by the primitive(s) could be provided in the bitmap, for example, but in an embodiment is provided as a list of relevant tiles, e.g. a list of the tiles which are only partially, and/or that are completely, covered.

The indication of the identity of the plurality of primitives in the group of plural primitives can be provided in any desired and suitable way. The indication could simply comprise a list of all the primitives in the group of primitives. However, in an embodiment this indication comprises the identity of the first primitive in the group (e.g., and in an embodiment, in the form of a pointer to the per-primitive data entry for the first primitive) and the number of primitives in the group of plural primitives (the number of subsequent per-primitive data entries the per-group data entry in question relates to). To facilitate this, the per-primitive data entries for the primitives in the group of plural primitives are in an embodiment stored as, or at least identifiable as, a contiguous sequence of data entries, so that identifying the per-primitive data entry and the number of per-primitive data entries that a group of plural primitives relates to allows all the per-primitive data entries for the primitives in the group to be identified.

In an embodiment the indication of the identity of the plurality of primitives in the per-group data entry also comprises the index of the primitive in the draw call that the first primitive in the group corresponds to.

In an embodiment, further information is determined for each of the plurality of primitives in the group of primitives and/or is stored in the per-primitive data entries for the primitives in the group. Correspondingly in an embodiment, further information is also or instead (and in an embodiment also) determined for the group of primitives and/or is stored in the per-group data entry for the group of primitives. This may include further pieces of information for each primitive and the group of primitives as is desired and suitable.

In an embodiment the information in the per-primitive data entries also comprises the depth (Z) range and/or the minimum depth (Z) of the primitive in question (in screen space), i.e. the method in an embodiment further comprises (and the processing circuitry is configured to) determining, for each primitive of the plurality of primitives, a depth range and/or a (e.g. minimum) depth value for the primitive, and/or storing for each primitive of the plurality of primitives, a depth range and/or a (e.g. minimum) depth value for the primitive in the per-primitive data entry for the primitive.

Similarly, in an embodiment, the information determined collectively for the group of primitives and stored in the per-group data entry also includes a depth range and/or value for the plurality of primitives, i.e. the collective depth range that the plurality of primitives spans and/or the, e.g. minimum, depth value that the plurality of primitives has. Thus in an embodiment the method further comprises (and the processing circuitry is arranged to) determining, for the group of primitives, a depth range and/or value for the plurality of primitives, and/or storing a depth range and/or value for the group of primitives in the per-group data entry for the group of primitives.

In these arrangements, the values, e.g. z-coordinates, for the depth range values and/or minimum depth values, may be and in an embodiment are, quantised.

The depth range could be determined either for each primitive individually, or for the plurality of primitives collectively, or the depth range may be determined for the primitives both individually and collectively. For example, when a bounding box is defined for the group of primitives, the depth range for the group of primitives may be determined from the bounding box, e.g. using the geometry transform from user space to screen space for the bounding box.

Where a depth range is determined for each primitive individually, those individual primitive depth ranges could then be combined to provide the primitive group depth range (and vice-versa, i.e. a determined primitive depth range for the primitive group could be used as or to derive individual primitive depth ranges for storing in the per-primitive data entries, if desired). Similarly, even if the depth range is determined individually, i.e. for each primitive, this information may be stored in the per-group data entry, instead of or in addition to being stored in the per-primitive data entries.

Storing depth ranges and/or minimum depth values for the individual primitives, for example, facilitates, e.g., sorting the primitives into depth order for processing (as will be discussed further below).

The plurality of primitives to be included in the group of primitives can be chosen in any suitable or desired way. In a simple case the group of primitives comprises all the primitives for a draw call or for a given render output, e.g. frame. However, in an embodiment the group of primitives contains fewer primitives than all the primitives in a draw call. In this case, the set of primitives being processed (e.g. for a draw call) is, in an embodiment, divided into plural groups of primitives, and each such group of primitives is, in an embodiment, then processed in the manner of the technology described herein. Thus, in an embodiment, the process of the technology described herein is repeated for a plurality of groups of primitives, e.g. in a draw call.

Thus, in an embodiment, the technology described herein processes a sequence of primitives to be rendered, e.g. for a draw call or draw calls, and operates to divide the sequence of primitives (e.g. draw call) into plural groups of plural primitives to be rendered, and then processes each such group of primitives in the manner discussed above, i.e. to generate a per-primitive data entry for each primitive in the group and a per-group data entry for the group.

In these arrangements the overall sequence of primitives (e.g. draw call) can be divided into groups of plural primitives in any desired and suitable manner.

In one embodiment each group of primitives comprises a set number of primitives and so, for example, the first n primitives in a list, e.g. for a draw call, are chosen to be in a first group of primitives, the next n primitives are chosen to be in a second group of primitives, etc. However this approach is rather prescriptive and may not result in an efficient grouping of primitives for subsequent rendering of the primitives.

Thus, in an embodiment the primitives are also or instead grouped together based on attributes of the primitives, e.g. determined from the vertices of the primitives. In an embodiment primitives that have and/or that are likely to have similar values for a given attribute or attributes are grouped together. This will, for example, then facilitate more efficient storing and compression of the data for the primitives and groups of primitives.

Primitive attributes to use in this regard may comprise the location of the primitives (in screen space) (e.g. with primitives having a similar location (e.g. that are close to each other) preferentially being grouped together), and/or the depth range or (e.g. minimum) values for the primitives (again, e.g., such that primitives that are close or closer to each other in "depth" are preferentially grouped together).

Thus, in an embodiment, the grouping of the primitives into primitive groups is based on one or more particular, e.g. selected, conditions, such as, and in an embodiment, one or more of: the number of primitives that are in the group; the locations of the primitives (in screen space); and the depth ranges of the primitives.

In an embodiment, a group of primitives is started, e.g. with the first primitive in a draw call, and then primitives are successively added to that group until it is determined that a particular condition or conditions that triggers the starting of a new primitive group is met.

For example, in the simplest case, the primitives could be successively added to a group of primitives until a selected threshold maximum number of primitives for a group is reached, with a new group then being started for the next primitive once the maximum number of primitives in the group has been reached.

However, in an embodiment, other criteria and conditions are also or instead used to trigger the commencement of a new group of primitives, such as, and in an embodiment, one or more attributes of the primitives, such as, and in an embodiment, their location, depth (e.g. range) values and/or geometry transform parameters (e.g. the draw call may be passed a uniform parameter or an array of (e.g. 4×4) geometry transform matrices, depending on, e.g., whether a single or multiple objects are to be processed by the draw call respectively).

In an embodiment, differences in the attribute values between successive primitives are assessed to determine whether or not a primitive is to be added to the existing group of primitives, or used to start a new group of primitives.

For example, a group of primitives could be added to until a threshold limit for the difference in location in screen space is reached, e.g. indicating that a subsequent primitive is not located near to the current group of primitives. This subsequent primitive could then form the start of a new group of primitives, e.g. based around its different location.

Particular examples of conditions that may be used to trigger the start of a new group of primitives include: whether there is already a particular, in an embodiment selected, minimum number of primitives in the group of primitives; assessing the absolute or the relative increase in area of a bounding box covering all the primitives in a group of primitives if the subsequent primitive is added to the group; assessing the absolute or the relative increase in the area which the primitives do not cover (the non-drawn area) of a bounding box covering all the primitives in a group of primitives if the subsequent primitive is added to the group; assessing the reduction in the ratio of the area which the primitives do not cover (the non-drawn area) to the area which the primitives do cover (the drawn area) in a bounding box covering all the primitives in a group of primitives if the subsequent primitive is added to the group; assessing the increase in depth range of the group of primitives if the subsequent primitive is added to the group; and/or assessing the absolute or the relative increase in the range of the geometry transform parameters of the group of primitives if the subsequent primitive is added to the group.

In an embodiment for each of these conditions, when the assessed quantity crosses a threshold, e.g. when the increase in the depth range of the group of primitives if the subsequent primitive were to be added to the group is greater than a pre-defined value, then a new group of primitives is formed. The decision on when to form a new group of primitives could be made based on one or more of the above conditions and is in an embodiment made based on a combination of two or more of the above conditions, e.g. if the increase in the size of the bounding box or the non-drawn area in the bounding box is above a threshold and there is already a minimum number of primitives in the group of primitives.

Alternatively, or in addition, as application programming interface (API) draw calls may now include arrays of shader kernels and/or arrays of vertices, one way to start a new group of primitives can be when a new shader kernel is used or when a new group or table of vertices is used.

As there may be multiple groups of primitives (and thus a plurality of per-primitive group data entries) defined, e.g. per frame but in an embodiment per draw call, the Applicants have recognised that it may be advantageous to also store information for a higher level than even the groups of primitives.

Thus in an embodiment there is stored a data entry for a collection of groups of primitives, the collection of groups of primitives comprising a plurality of groups of primitives, each group comprising a plurality of primitives to be rendered.

In this case, the groups of primitives can be grouped into a collection or collections of groups of primitives in any desired and suitable manner, for example in the manner or manners outlined above for choosing the plurality of primitives to be included in a group of primitives. In an embodiment, all the groups of primitives for a draw call and/or for a given render output (e.g. frame) are grouped together to form a collection of groups of primitives. Thus, for example, where a given render output comprises plural draw calls, there will in an embodiment be a collection of groups of primitives for each draw call. (And in this case there would, for example, be a further, e.g. frame, data entry that represents collectively all the draw calls for the frame.)

Each data entry for a collection of groups of primitives in an embodiment stores an indication of the identity of the plurality of primitives in the collection of groups of primitives, and an indication of the rendering tiles that the (primitives in the) collection of the groups of primitives extends over.

This information can be determined and represented in any suitable and desired manner, e.g. and in an embodiment in the manner or manners discussed above for the per-primitive and per-group data entries. Thus, for example, the indication of the rendering tiles that the collection of groups of primitives extends over can be indicated as a bitmap, as an area representation (e.g., and in an embodiment, a bounding box), or as a combination of the two.

Similarly, the indication of the identity of the plurality of primitives in the collection of the groups of primitives could comprise one or more of: a list of all the plurality of primitives in the collection of the groups of primitives; the identity of the first primitive in the collection (e.g. a pointer to the per-primitive data entry for the first primitive), the identity of the first group of primitives in the collection (e.g. a pointer to the per-group data entry for the first group of primitives in the collection), the number of primitives in the collection of groups of primitives; and the number of groups of primitives in the collection of groups of primitives.

Similarly, in an embodiment, the information stored collectively for a collection of groups of primitives also includes the depth range of the plurality of primitives, i.e. the collective depth range that the plurality of primitives in the collection of groups of primitives spans. As the collection of groups of primitives in an embodiment corresponds to the groups of primitives for a draw call, the information stored collectively for a collection of groups of primitives in an embodiment also comprises information to render the plurality of primitives in the collection of groups of primitives. Thus the information in an embodiment comprises one or more of: draw call parameters, references to the frame buffers, references to the textures and/or input geometry data.

It will be appreciated that the advantages afforded by having information stored at different levels of hierarchies in the per-primitive and per-group data entries are amplified by adding a further level to the hierarchy, i.e. the per-collection of groups data entry.

Although one embodiment comprises a hierarchy containing these three levels, the technology described herein also extends to a greater number of levels as is suitable and desired. For example, it may be advantageous to provide a fourth level corresponding to the overall render output (e.g. frame), e.g. if the per-collection of groups data entries each correspond to a draw call.

Thus in an embodiment there is stored a data entry for a grouping of collections of groups of primitives, the grouping of collections of groups of primitives comprising a plurality of collections of groups of primitives, each group comprising a plurality of primitives to be rendered.

The fourth level may not necessarily correspond to the overall render output but to a grouping of any plural number of draw calls. This grouping may be formed in any desired and suitable manner, for example in the manner or manners outlined above for choosing the plurality of primitives to be included in a group of primitives, or for choosing the plural groups of primitives to be included in a collection of groups of primitives. In an embodiment, all the collections of groups of primitives for draw calls which have similar characteristics, e.g. containing triangles which are rendered opaque, are grouped together. In an embodiment each data entry for a grouping of collections of groups of primitives comprises the information common to all the draw calls being stored in the fourth level. This enables the draw calls to be re-ordered within the grouping that is described by the fourth level, as will be discussed further below.

In an embodiment each data entry for a grouping of collections of groups of primitives stores an indication of the identity of the plurality of primitives in the grouping of collections of groups of primitives, and an indication of the rendering tiles that the (primitives in the) grouping of collections of the groups of primitives extends over.

This information can be determined and represented in any suitable and desired manner, e.g. and in an embodiment in the manner or manners discussed above for the per-primitive, per-group and per-collection data entries. Thus, for example, the indication of the rendering tiles that the grouping of collections of groups of primitives extends over can be indicated as a bitmap, as an area representation (e.g., and in an embodiment, a bounding box), or as a combination of the two.

Similarly, the indication of the identity of the plurality of primitives in the grouping of collections of the groups of primitives could comprise one or more of: a list of all the plurality of primitives in the grouping of the collections of the groups of primitives; the identity of the first primitive in the grouping (e.g. a pointer to the per-primitive data entry for the first primitive), the identity of the first group of primitives in the collection (e.g. a pointer to the per-group data entry for the first group of primitives in the collection), the identity of the first collection of groups of primitives in the grouping (e.g. a pointer to the per-collection data entry for the first collection of groups of primitives in the grouping), the number of primitives in the grouping of collections of groups of primitives, the number of groups of primitives in the collection of groups of primitives, and the number of collections of groups of primitives in the grouping of collections of groups of primitives.

Similarly, in an embodiment, the information stored collectively for a grouping of collections of groups of primitives also includes the depth range of the plurality of primitives, i.e. the collective depth range that the plurality of primitives in the grouping of collections of groups of primitives spans. As the grouping of collections of groups of primitives in an embodiment corresponds to the collections of groups of primitives for a plural number of (similar) draw calls, in an embodiment the information stored collectively for a grouping of collections of groups of primitives also comprises information to render the plurality of primitives in the grouping of collections of groups of primitives. Thus in an embodiment the information comprises one or more of: draw call parameters, references to the frame buffers, references to the textures and/or input geometry data.

As has been mentioned above, there are a number of advantages to storing information for the plurality of primitives to be rendered in a hierarchy of different levels of data entries, which will now be outlined further.

For example, the data in the data entries can be used to determine a more efficient processing (rendering) order for the primitives and/or groups of primitives (and in an embodiment this is done). In this case, the set of per-primitive entries (where provided) for a given group of primitives could, e.g., be ordered based on the data stored for the per-primitive data entries, with the primitives then being processed in the order of their per-primitive data entries. A collection of plural groups of plural primitives could be similarly sorted and organised, as could a grouping of plural collections of plural groups of plural primitives.

Thus, in an embodiment, the per-primitive data entries (where provided) for a group of primitives are arranged in the order that the primitives will then be processed in by the rendering process (and the rendering process correspondingly will work through the primitives in a group of primitives in the order of their per-primitive data entries). Correspondingly, in an embodiment the per-group data entries for the groups of plural primitives are ordered in the order that the rendering process will then process the groups of plural primitives (and the rendering process correspondingly is configured to process the groups of plural primitives in the order of their per-group data entries), and so on, e.g. for the collection of groups of primitives and/or for the grouping of collections of groups of primitives.

In these arrangements, any suitable data that is stored in the data entries can be used to order and sort the primitives, groups of primitives, etc.

In an embodiment, the primitives and/or groups of primitives and/or collections of groups of primitives are sorted according to their associated depth ranges and/or (e.g. minimum) values, and in an embodiment such that primitives that are closer to the viewpoint will be processed before primitives that are further away in depth. This will then mean that closer primitives will be processed (and should thus fill the depth buffer) first, thereby allowing any depth tests within the rasterisation and rendering process (e.g., and in particular, an early depth test) to be more likely to cull later primitives from processing.

Thus, in an embodiment, the per-primitive data entries and/or the per-primitive group data entries for the plurality of primitives and/or of primitive groups and/or of collections of primitive groups are ordered for the purpose of then processing (rasterising and rendering) the primitives, using their associated depth ranges and/or values, e.g. with the closest in screen space being ordered to be processed first.

Thus in an embodiment the method further comprises (and the processing circuitry is arranged to) using stored depth ranges and/or values for the per-primitive data entries to determine a processing order for the primitives, and, in an embodiment, if necessary, reordering the per-primitive data entries for the primitives based on their associated depth ranges and/or values.

Correspondingly in an embodiment the method further comprises (and the processing circuitry is arranged to) using stored depth ranges and/or values for the per-group data entries to determine a processing order for the primitive groups, and, in an embodiment, if necessary, reordering the per-group data entries for the primitive groups based on their associated depth ranges and/or values.

The depth ranges and/or values stored for the primitives individually, and/or collectively, as part of a group and/or a collection of groups and/or a grouping of collections, can be used to determine the order of the plurality of primitives (in the respective group or collection of groups) and/or to reorder the plurality of primitives (in the respective group, collection of groups and/or grouping of collections). Thus the order of the primitives can be determined at a group, draw call and/or higher level.

In these arrangements the per-primitive data entries, the per-group data entries and/or the per-collection data entries (where provided) could be written out (stored) in the desired order (e.g. dependent on their associated depth ranges) as they are created. Alternatively, the data entries could initially be written in the order that they are generated as the primitives are "tiled", but with the data entries then being reordered, if necessary and desired, based on attributes, such as the depth ranges, associated with the data entries.

In an embodiment, the respective per-collection, per-group and/or per-primitive data entries (where provided), etc., can be, and are in an embodiment, reordered (e.g. based on the data within the data entries) in order to control and sort the order that the primitives will be processed in (at the rendering stage). To facilitate this, individual primitives, groups of primitives and collections of groups of primitives (and/or their per-primitive, per-group data entries or per-collection data entries) can in an embodiment be flagged or otherwise marked to indicate whether they can be reordered or not.

The ordering (and/or reordering) of the primitives, groups of primitives and/or collections of groups of primitives, etc., based on the data entries for the primitives can be performed and implemented in any desired and suitable manner. In an embodiment, the process is implemented as a two-pass process, with the first processing pass being performed to create and store the data entries for the primitives, groups of plural primitives, collections of groups of primitives, etc., and a second processing pass then assessing and using the created data entries to order the primitives, groups of primitives and/or collections of groups of primitives (the data entries for the primitives, groups of plural primitives, collections of groups of primitives, etc.), etc., for subsequent processing purposes.

Another advantage of arranging the information relating to the plurality of primitives in the manner of the technology described herein is that it can facilitate reducing the storage space, and also the bandwidth, required for that information.

For example, the organisation of the primitives into groups will tend to mean that the per-primitive data entries should be similar between adjacent primitives in the group, particularly if the plurality of primitives in a group of primitives are chosen in an intelligent manner, e.g. by their location in screen space. This will then facilitate, inter alia, compression of the data entries using compression schemes, such as run length encoding.

Correspondingly, as the per-primitive data entries should be similar between adjacent primitives in a given group of plural primitives, then representing the per-primitive data entries in relative terms, e.g. as a set of differences relative to the previous per-primitive data entry, will not only be possible, but should reduce the amount of data that is needed to store the per-primitive data entries.

Thus, in an embodiment, the information (indications) that is stored for a (and in an embodiment for each) per-primitive data entry comprises an indication of the differences for the primitive that the per-primitive data entry relates to compared to a (and in an embodiment to the) preceding per-primitive data entry. For example, the per-primitive data entry for a given primitive could indicate the difference (e.g. in area) between the one or more rendering tiles that that primitive should be processed for and that the previous primitive should be processed for.

Correspondingly, the per-primitive data entries for primitives within a group of primitives are in an embodiment indicated in relative terms, in an embodiment relative to the preceding per-primitive data entry for the group.

In these arrangements, the data values to be used for the data entries are in an embodiment quantised and then compared with those in the previous per-primitive data entry. Thus in an embodiment the method comprises the step of (and the processing circuitry is arranged to), for each of the plurality of primitives, quantising the indications to be stored as the per-primitive data entry for the primitive. In an embodiment the method also or instead comprises the step of (and the processing circuitry is arranged to), for each of the plurality of primitives, comparing the indications to be stored as the per-primitive data entry for the primitive with the indications to be stored as the per-primitive data entry for the previous primitive in the group of primitives. (For the first primitive in a group of primitives the comparison step may be omitted as there is no previous per-primitive data entry for the group.)

As well as or instead of (and in an embodiment as well as) storing the per-primitive data entries for primitives within a group of primitives in relative terms (e.g. as a set of differences relative to a previous per-primitive data entry), in an embodiment the same approach is used for the per-group data entries (where there are plural groups of plural primitives to be considered for a given graphics processing output being generated), and, where appropriate, for the per-collection of primitive groups data entries. In an embodiment this is done in a similar manner to that discussed above for the per-primitive data entries. Thus, for example, in an embodiment the per-group data entries for groups of primitives within a collection of groups of plural primitives are indicated in relative terms, in an embodiment relative to the preceding per-group data entry for the collection of groups of primitives, and in an embodiment as a set of differences relative to the previous per-group data entry.

As well as or instead of (and in an embodiment as well as) storing the per-primitive and/or per-group, etc., data entries in relative terms within their own respective sets of data entries, in an embodiment, the data entries are stored in relative terms relative to a data entry that is higher in the hierarchy of data entries. In an embodiment, common information is stored at one level of the hierarchy, and then the lower level data entries are stored and indicated relatively to that common information (and in an embodiment as a set of differences relative to that common information).

For example, for a group of plural primitives, common information, e.g. the common tiles over which all the primitives in the group fall, could be determined and stored in the per-group data entry, and the differences for each of the primitives from this common information could be determined and stored for each respective per-primitive data entry.

Similarly, for a collection of groups of plural primitives, common information could be determined and stored in the per-collection of primitive groups data entry and the differences for each of the groups of primitives from this common information could be determined and stored for each per-group of primitives data entry.

Also similarly, for a grouping of collections of groups of plural primitives, common information could be determined and stored in the per-grouping of collections of primitive groups data entry and the differences for each of the collections of groups of primitives from this common information could be determined and stored for each per-collection of primitives groups data entry.

This again allows information to be stored in a more storage space and bandwidth efficient manner.

Thus, in an embodiment, the data entries at a lower level in the hierarchy are stored as (and indicated as) differences relative to information that is stored in an associated data entry that is higher in the hierarchy. Correspondingly, in an embodiment, information that is common to all (that can be used for all) the lower level data entries that a higher level data entry relates to is stored in the higher level entry with the set of lower level data entries then simply indicating any differences in relation to that common information.

For example, in such an arrangement, each per-primitive data entry may only need to describe the area that it falls within the area encompassed (within the bounding box) of the per-group data entry that it belongs to. This will then allow, for example, the per-primitive data entries to provide their indications using less storage (in a more storage-efficient form).

It would also be possible, for example, for the higher level data entries to store the data, such as the depth ranges, in a more exact form than the lower level, e.g., per-primitive, data entries (or vice-versa). They may also contain additional information relative to the lower level data entries (or vice-versa).

In an embodiment, when information is stored at more than one level in the hierarchy, more information is stored in the higher level data entries. Thus, for example, and in an embodiment, more data is stored in the per-group data entries than in the related per-primitive data entries. For example, depth information may be stored in the per-group data entries, but not in the per-primitive data entries, if desired. Similarly, in an embodiment information is stored indicating which tiles are completely covered and which tiles are only partially covered at higher levels in the data entry hierarchy, but not necessarily for the lower level, per-primitive data entries.

In an embodiment, repetition or duplication between data stored in higher and lower data entries in the hierarchy is avoided where possible.

Thus, for each piece of information determined for a group of primitives, either for each primitive individually or for the group collectively, a choice can be made as to in which data entry or entries to store each piece of information as is suitable and desired, e.g. depending on what may be more efficient for the intended use or application of that information.

In an embodiment, some or all of the data entries, and in an embodiment at least the per-primitive data entries for a given group of primitives, are compressed (encoded and stored in a compressed form).

In these arrangements, the information written out to the data entries can be compressed in any suitable and desirable manner. Examples of compression techniques that can be used include entropy encoding (e.g. Huffman coding, arithmetic coding, etc.), run length encoding, etc.

Such compression can be made more effective by ordering the primitives (their data entries) so as to facilitate the compression process (and thus in an embodiment, this is what is done). For example, if the per-primitive data entries are ordered by depth values, so that it is known that the depth values will only ever increase, the compression of those data values can be improved.

Similarly, where the data for each successive per-primitive data entry is stored or indicated as a set of differences relative to the preceding per-primitive data entry, then again the compression of those data entries can be enhanced. Again, the primitives could be, and are in an embodiment, ordered so as to further reduce any differences between consecutive per-primitive data entries that may need to be encoded.

For example, ordering the primitives by their depth range should reduce the differences between the depth range values of consecutive primitives.

In an embodiment, where an encoding (compression) scheme is used, then in an embodiment each group of primitives is started at the start of a respective (e.g. entropy) encoding context, so that there is no need when decoding (decompressing) the encoded data to read, e.g., a per-primitive data entry, from another (e.g. previous) group of primitives.

In an embodiment, the per-group of primitives data entries, the per-collection of groups of primitives data entries, and/or the per-grouping of collections of groups of primitives data entries are also or instead (and in an embodiment also) compressed (encoded and stored in a compressed form).

The information in the data entries could be determined and written out at any suitable and desired point in the graphics processing process. For example, one or more of the data entries may be determined and written out by a central processing unit (CPU) of the apparatus, e.g. in advance of their subsequent use (e.g. by a graphics processing unit (GPU)). This may enable the data entries to be generated "offline" such that this processing does not introduce latencies into the rendering of the primitives and may be more applicable when the data entries have been created prior to the transformation of the geometry of the individual primitives. It may also allow the draw calls which have been made to be tracked, e.g. by a driver, along with their parameters and/or the data buffers that have been updated, in order to determine which data entries may be able to be reused (which may happen multiple times, e.g. across a number of frames) and which may need to be determined again.

However in an embodiment the information determined and written out to the per-primitive data entries (where provided) at least is determined and stored at a tiling stage (as part of a tiling process), before the primitives are to be rasterised and rendered. In an embodiment the tiling process is distributed over the compute cores of a graphics processing unit (GPU), to ensure the scalability of the tiling process with the GPU's performance.

The determining and writing out of the information in the data entries may be carried out by different processing units or stages depending on the level of the data entry to be prepared. For example the per-collection and per-grouping data entries may be determined and written out using a driver, e.g. running on the CPU, whereas the per-group and per-primitive data entries may be determined and written out using, e.g. a tiling stage of a GPU.

In an embodiment the tiling stage will generally first transform at least some of the issued geometry (primitives) (e.g. from user space to screen space), by computing the screen space projection for each primitive, with the vertices in an embodiment calculated on demand. Thus in an embodiment the method comprises the step of (and the processing circuitry is arranged to), for each of the plurality of primitives, computing the screen-space projection for the primitive.

A vertex cache can be used to avoid repeated calculation of the vertices, e.g. for indexed draw calls with common primitives and/or vertices, i.e. in an embodiment the apparatus comprises a cache for the storage of attribute information for the plurality of primitives. In an embodiment this transformation and calculation of the vertices will also calculate the z-information for a primitive, i.e. including the depth range information.

In an embodiment, following the above step of transforming the geometry, each primitive is rasterised at a limited resolution, suitable for determining the tiles the primitive covers in screen space, e.g. through use of a bounding box and/or a bitmap. This allows the processing circuitry to be able to determine the one or more rendering tiles that the primitives and group of primitives should be processed for.

Alternatively, as discussed above, only the geometry for the bounding box for the plurality of primitives in each group of primitives may be transformed at this stage and not the geometry for the individual primitives. In this embodiment, the method may comprise the steps of (and the processing circuitry is arranged to), for each of the groups of primitives, defining a bounding box in user space, and computing the screen-space projection for the bounding box.

The method and apparatus may be configured to operate only on the fully transformed geometry of the primitives or on the partially transformed geometry (e.g. with only the geometry for the bounding box for the group of primitives being transformed and not the geometry for the individual primitives). However in another embodiment the method and apparatus are configured such that they are able to operate on both the fully or partially transformed geometries, e.g. to accommodate both when the geometry is transformed beforehand, e.g. offline, and when the geometry is transformed during use of the method and apparatus.

In this latter embodiment the method may comprise the step of (and the processing circuitry is arranged to): determining if the geometry of the individual primitives has been transformed. If the geometry of the individual primitives has been transformed then the per-primitive data entries (where provided), and the per-group data entries, etc., are then created using the fully transformed geometry. If not, then the per-primitive data entries (where provided), and the per-group data entries, etc., are determined using the partially transformed geometry, e.g. for the bounding box for the group of primitives.

The per-primitive data entries (where provided), and the per-group data entries, etc., can then be stored. This may comprise, as discussed above, determining differences between respective data entries and storing only the differences, and/or compressing the data entries (or a set of data entries) so that they can be stored in a compressed form.

During the above described process for determining and writing out the information to the data entries during the tiling stage, the primitives could be considered one by one and the per-primitive data entries (where provided) determined and written out sequentially. This gives the advantage of fast processing of the data, but may not be as effective for compressing the data, e.g. because it may not be possible to sort the primitives into an order before the per-primitive data entries are determined.

To facilitate this, in an embodiment a buffer is provided and used to hold the group of primitives while they are being processed, e.g. while the per-primitive data entries are being determined and written out.

However, in an embodiment, a group of primitives (and in an embodiment each group of primitives) can be, and is in an embodiment considered and processed as a whole when determining and writing out the per-primitive and per-group data entries for the group of primitives. This can then enable, for example, the per-group data entry to be determined such that it reduces the data storage for the per-primitive data entries.

Once the per-primitive and per-primitive group (and per-collection of primitive groups and per-grouping of collections of primitives groups, if appropriate, etc.) data entries have been prepared in the manner described above, they can then be stored for use when processing.

The data entries can be stored in any desired and suitable manner. For example, they can be stored as linear lists, in the order that the data entries should be considered when processing them (and in one embodiment this is what is done).

However, it is not necessary to store the data entries in linear lists. They could equally be arranged as a tree structure (and in one embodiment this is what is done). For example, the per-group and per-collection of primitive groups data entries could be stored in a binary tree (e.g. with a separate tree for each group of primitives for a draw call and a separate tree for all per-collection of groups data entries for all the collections of groups). In an embodiment the entries in the tree are sorted based on depth values.

The data entries can be stored in any suitable and desired storage. In an embodiment the data entries are stored in the main memory of the system. This is suitable for storing large numbers of data entries corresponding to the significant number of primitives used for rendering a frame (often millions).

The stored data entries describing the primitives to be processed can then be used to render the graphics output, e.g. frame to be displayed.

The stored data entries can be used in any desired and suitable manner when processing the primitives to generate the desired render output.

In an embodiment, the stored data entries are traversed starting with the highest level in the hierarchy down to the per-primitive data entries (in the order that the data entries are to be considered when processing the primitives and groups of primitives, etc. that they represent).

Thus, for example, in an embodiment the rendering process will traverse the "tree" of data entries, in an embodiment from the highest level node (e.g. the per-collection of groups of primitives node) working down towards the per-primitive data entries (if the traversal is to continue).

The data entries (e.g. tree) should be and are, in an embodiment, traversed in an order that will preserve the desired processing order for the primitives.

Thus, in an embodiment the process of using the data entries begins at a higher level and then the data entries are traversed progressively downwards through the hierarchy to the per-primitive data entries, where it is appropriate to do that.

Thus, for example, a per-group data entry will be used to determine for a tile being processed whether or not the plurality of primitives in the group referred to by the per-group data entry fall within the tile. When the tile is at least partly covered by this group of primitives, the plurality of primitives in the group of primitives may then be processed according to a number of different embodiments.

In one embodiment, e.g. in which per-primitive data entries have not been produced and stored, the plurality of primitives in the group of primitives are rendered in a conventional manner, i.e. without reference to any per-primitive data entries. In this embodiment all of the plurality of primitives in the group of primitives may be rendered, i.e. without any pre-selection, though it will be appreciated that during the rendering process it may be determined that some of the primitives will not be visible for the tile being processed (e.g. if they fall outside the tile or are obscured by other primitives), and are thus discarded.

In another embodiment, e.g. in which per-primitive data entries are available, when the tile has been determined (from the per-group data entry) to at least partly covered by this group of primitives, the per-primitive data entries for the primitives in the group are each considered to determine whether or not each primitive then in the group should be processed for the tile. When the tile is at least partly covered by a primitive, the part of the primitive which falls within the tile is rendered.

In yet a further embodiment, in which per-primitive data entries have not been produced and stored at this stage, when the tile has been determined (from the per-group data entry) to at least be partly covered by this group of primitives, it can be determined whether to process individually each of the plurality of primitives in the group of primitives or not. As discussed above, this may comprise using an indication of the direction the primitive is facing, e.g. the normal information of the primitive, but in an embodiment the method comprises determining whether or not each primitive of the plurality of primitives should be processed for the rendering tile in question. This may comprise creating a per-primitive data entry comprising an indication of the rendering tiles that it has been determined the primitive should be processed for and then testing against the tile being rendered to see if each individual primitive should be rendered or not for the tile.

Thus the per-primitive information may be used to discard primitives, e.g. owing to them falling outside the tile, facing backwards and/or being fully covered by other primitives (depending on the information determined for the primitives individually), without first having to render them.

If the per-primitive data entries are produced at this stage they may be stored, e.g. in a cache, so that it is available for referring to again, e.g. if the same primitive is to be considered for a different tile.

Correspondingly, when it is determined when checking the per-group data entry that the group of primitives does not extend over the tile in question at all, then the process can immediately move to the next group of primitives to be considered.

In an embodiment once a given group of primitives has been considered for a tile in this way, the process then moves on to the next group of primitives (if any), and so on, until all the groups of primitives to be processed have been considered for the tile.

Correspondingly, where data entries for collections of groups of primitives are prepared, then in an embodiment the process starts by first considering the per-collection of primitives data entry to determine if the corresponding collection of groups of primitives falls at least partially within the tile in question, and if it does then proceeds to iterate through the groups of primitives in the collection, but if it does not, then proceeding to the next collection of groups of primitives to be considered, and so on. A similar iterative process is performed when higher levels of data entries are prepared and stored, e.g. for groupings of collections of groups of primitives.

In an embodiment this is done for each tile that the render target (e.g. frame) being processed has been divided into. Thus, the various data entries for the render output would be considered for each tile, to determine which primitives should be rendered for the tile in question.

It will be appreciated in this regard that all the primitives will in effect be tested to determine if they should be processed for each tile. However, the hierarchical structure of the data entries can be exploited to determine quickly which primitives are required to be rendered for a particular tile.

Thus when rendering a graphics output using the data entries of the technology described herein, e.g. in the embodiment in which the per-primitive data entries are not available at this stage, in an embodiment the method comprises the steps of (and the processing circuitry is arranged to), for a tile (and in an embodiment for each tile) of the render output:

reading a data entry for a group of primitives for the render output;

determining, using the indication in the data entry for the group of primitives, if the group of primitives extends over the tile; and when the group of primitives is determined to extend over the tile:

rendering primitives of the plurality of primitives in the group of primitives, identified by the indication of the identity of the plurality of primitives in the data entry for the group of primitives, that fall at least partially in the tile.

Another embodiment of the technology described herein comprises a method of generating a render output in a tile-based graphics processing system, the method comprising, for each tile of the render output:

reading a data entry for a group of primitives for the render output, which data entry comprises an indication of the identity of the plurality of primitives in the group of primitives, and an indication of the rendering tiles that it has been determined the group of primitives should be processed for;

determining, using the indication in the data entry for the group of primitives, if the group of primitives should be processed for the tile; and when the group of primitives is determined to be processed for the tile:

rendering the primitives of the plurality of primitives in the group of primitives, identified by the indication of the identity of the plurality of primitives in the data entry for the group of primitives, that fall at least partially in the tile.

The technology described herein also comprises a tile-based graphics processing system comprising processing circuitry configured to, when generating a render output, for each tile of the render output:

read a data entry for a group of primitives for the render output, which data entry comprises an indication of the identity of the plurality of primitives in the group of primitives, and an indication of the rendering tiles that it has been determined the group of primitives should be processed for;

determine, using the indication in the data entry for the group of primitives, if the group of primitives should be processed for the tile; and when the group of primitives is determined to be processed for the tile:

render the primitives of the plurality of primitives in the group of primitives, identified by the indication of the identity of the plurality of primitives in the data entry for the group of primitives, that fall at least partially in the tile.

In an embodiment, when the group of primitives is determined to be processed for a tile, it can be determined whether or not to process each primitive individually. Then only the primitives for which it is determined that they should be processed may be rendered. Thus in an embodiment the method comprises the step of (and the processing circuitry is configured to): for each of the plurality of primitives in the group of primitives, identified by the indication of the identity of the plurality of primitives in the data entry for the group of primitives:

determining whether to process the primitive for the tile or not; and when it is determined that the primitive should be processed, rendering at least a part of the primitive that falls in the tile.

The information determined for each individual primitive may be, and in an embodiment is, written out to storage as a data entry, e.g. for each primitive of the group of primitives, thus allowing this information to be available for future use in connection with these primitives, e.g. to determine whether or not to process these primitives at an individual per-primitive level. Thus in an embodiment the method comprises the step of (and the processing circuitry is arranged to): storing, for each primitive of the plurality of primitives, a data entry comprising information that can be used to determine whether to process the primitive or not.

In the embodiment in which the per-primitive data entries are available, when rendering a graphics output using the data entries of the technology described herein, in an embodiment the method comprises the steps of (and the processing circuitry is arranged to), for a tile (and in an embodiment for each tile) of the render output:

reading a data entry for a group of primitives for the render output;

determining, using the indication in the data entry for the group of primitives, if the group of primitives should be processed for the tile; and when the group of primitives is determined to be processed for the tile:

for each of the plurality of primitives in the group of primitives, identified by the indication of the identity of the plurality of primitives in the data entry for the group of primitives:

reading a data entry for that primitive, which data entry comprises information that can be used to determine whether to process the primitive for the tile or not;

determining, using the information that can be used to determine whether to process the primitive or not in the primitive's data entry, if the primitive should be processed for the tile; and when it is determined that the primitive should be processed, rendering at least a part of the primitive that falls in the tile.

In these embodiments, the step of determining, using the information that can be used to determine whether to process the primitive or not in the primitive's data entry, if the primitive should be processed may be performed in any suitable and desired manner, e.g. depending on the information contained in the primitive's data entry.

For example, in the embodiment where the information comprises normal information for the primitives, the normal information for each primitive can be, and in an embodiment is, used in conjunction with the indication, in the data entry for the group of primitives, if the group of primitives extends over the tile, e.g. the transformed coordinates of the bounding box for the group of primitives, to determine if the primitive is back-facing.

If the primitive is back-facing then this primitive does not need to be processed further and the next primitive in the group of primitives can be considered. If the primitive is not determined to be back-facing (this may be a conservative test so ultimately the primitive may still not be visible in the final render output) then the geometry of the primitive can be transformed from user space into screen space, allowing the primitive to be rendered.

The normal information may be used to detect back-facing primitives in any suitable and desired manner. In order to do this, in an embodiment the geometry transform for the primitives satisfies one or more conditions, e.g. that the geometry transform is an affine transformation. In one embodiment the back-facing primitives are detected using the normal information by sorting the normal vector for each primitive into a number of bins, with each bin covering a certain solid angle (it may be this binned information which is stored in the per-primitive data entry). The coordinates of each corner in screen space of the transformed bounding box (from the bounding box stored in the group of primitives data entry, which may or may not have been transformed already) for the group of primitives is also sorted into a number of bins (not necessarily the same number of bins as for the primitive normal information). The binned screen space coordinates are then used with a lookup table to determine which normal bins for the primitive are visible for each corner of the primitive. This may be represented by a bitmask or other representation. An OR between the normal bins that are visible for each corner of the primitive is then calculated to determine which primitives in the group of primitives may be visible.

This is a conservative test because some primitives which are initially thought to be visible will be determined not to be visible after they have their geometry transformed.

Correspondingly, in the embodiment in which the per-primitive data entries each comprise an indication of the rendering tiles that it has been determined the primitive should be processed for, in an embodiment the method comprises the steps of (and the processing circuitry is arranged to):

determining, using the indication of the one or more rendering tiles that the primitive should be processed for in the primitive's data entry, if the primitive should be processed for the tile; and when it is determined that the primitive should be processed for the tile, rendering at least the part of the primitive which falls within the tile.

As discussed above, the method and apparatus may be configured to operate only using data entries prepared using the fully transformed geometry of the primitives or prepared using partially transformed geometry (e.g. with only the geometry for the bounding box for the group of primitives being transformed and not the geometry for the individual primitives).

However, in another embodiment the method and apparatus are configured such that they are able to operate using data entries prepared using the fully or partially transformed geometries, e.g. to accommodate both when the data entries are prepared beforehand, e.g. offline, and when the data entries are prepared during use of the method and apparatus.

In this latter embodiment the method may comprise the step of (and the processing circuitry is arranged to): determining if the geometry of the individual primitives has been transformed. This step of determining may be performed in any suitable and desired manner. For example, if this step of determining was performed at the stage of preparing the data entries, the previously determined result could be used, e.g. by referring to a flag which was set previously, without having to perform this determining step again. However, in an embodiment, at this stage the step of determining comprises determining if the per-primitive data entry contains information based on the transformed geometry, e.g. if the per-primitive data entry contains an indication of the rendering tiles the primitive is to be processed for. As will be appreciated, some embodiments exist in which the per-primitive data entry may not exist and will thus return a negative answer to this determination.

In the embodiment in which the geometry of the individual primitives is not fully transformed when the data entries are prepared, when it is determined that a group of primitives extends over a tile (using the indication of the tiles that the group of primitives should be processed for), the geometry of all of the plurality of primitives in the group of primitives may be transformed. The transformed geometry for each primitive can then be used to determine whether the individual primitives in the group should be processed for the tile.

However, where information that can be used to determine whether to process a primitive or not is available, then in an embodiment that information is used to determine whether the primitive should be processed or not, before computing the screen space projection for the primitive (and before the step of rendering at least the part of the primitive).

Thus in an embodiment only the primitives for which it has been determined that they are to be processed have their geometry transformed.

Information relating to the computed screen-space projection for the primitive may then be added to the primitive's data entry. This may comprise the screen space projection itself, i.e. the screen space coordinates of the corners of the primitive, or an indication of the rendering tiles the primitive is to be processed for, i.e. that the primitive's data entry may have contained if the primitive's geometry had been transformed prior to the data entry being prepared initially.

Additionally or alternatively, other information may be added to the data entry for each primitive after its screen space projection has been computed. This may comprise, for example, information indicating if the group of plural primitives (for which the individual primitive is a member) is visible when rendered. This information may then be used when the group of primitives is next rendered (e.g. in a subsequent frame) to decide if only the bounding box for the group of primitives should have its geometry transformed (e.g. if the group of primitives was previously not visible and thus the existing data in each of the primitives' data entries is (re-) used) or if the individual primitives should have their geometry transformed (e.g. if the group of primitives was previously visible).

However, in an embodiment information is not added to the primitive's data entry after the primitive's geometry has been transformed.

In an embodiment, when it determined that the group of primitives does not extend over the tile, the process then moves to test the next group of primitives (if any), i.e. reads the per-group data entry for that next group of primitives, and so on.

Similarly, in an embodiment, once one group of primitives has been processed for the tile in this way, the process then moves on to the next group of primitives (if any), and so on.

Correspondingly, in embodiments in which per-collection of primitive groups data entries are stored, in an embodiment a per-collection data entry is considered first, before the relevant per-group data entries (and then the relevant per-primitive data entries (if necessary)). Thus in an embodiment the method comprises the steps of (and the processing circuitry is arranged to), for a tile (and in an embodiment for each tile) of the render output:

reading a data entry for a collection of groups of primitives;

determining, using the indication in the data entry for the collection of groups of primitives, if the collection of groups of primitives extends over the tile; and when the collection of groups of primitives is determined to extend over the tile then testing each of the groups of primitives in the collection of groups of primitives, identified by the indication of the identity of the groups of primitives in the data entry for the collection of groups of primitives against the tile in the manner discussed above.

Also correspondingly, in embodiments in which per-grouping of collections of primitive groups data entries are stored, in an embodiment a per-grouping data entry is considered first, before the relevant per-collection and then the per-group data entries (and then the relevant per-primitive data entries (if necessary)). Thus in an embodiment the method comprises the steps of (and the processing circuitry is arranged to), for a tile (and in an embodiment for each tile) of the render output:

reading a data entry for a grouping of collections of groups of primitives;

determining, using the indication in the data entry for the grouping of collections of groups of primitives, if the grouping of collections of groups of primitives extends over the tile; and when the grouping of collections of groups of primitives is determined to extend over the tile then testing each of the collections of groups of primitives in the grouping of collections of groups of primitives, identified by the indication of the identity of the collection of groups of primitives in the data entry for the grouping of collections of groups of primitives against the tile in the manner discussed above.

In an embodiment the processing of the primitives for a tile using the data entries comprises at least rasterising the primitives to generate graphics fragments to be processed, subjecting the primitives and/or fragments to an early depth test, and rendering the fragments generated by the rasteriser to generate rendered fragment data. In an embodiment the rendering process operates as a fragment shader.

As discussed above, in an embodiment the data entries are traversed (iterated through) in a particular, e.g. sorted, order, e.g. according to their associated depth values. This allows the primitives for a tile to be processed in an order such that an early depth test, for example, should more efficiently cull obscured primitives.

In an embodiment, to enhance the possibility of early depth culling, a depth buffer using the depth information contained in the per-group and/or per-collection of primitive groups data entries is maintained, and used for early rejection (where possible) of per-group and/or per-collection of groups data entries during the rendering process.

In an embodiment the rendered primitives are written out to a tile buffer and thence to a frame buffer (e.g.), e.g., from where the frame can be displayed, e.g. using a display controller.

The technology described herein can be used for all forms of output that graphics processing system may be used to generate, such as frames for display, render to texture outputs, etc. The final output of graphics processing can, e.g., be written, e.g., to a frame buffer, in main memory, from where it can then, e.g., be provided to a display for display, or otherwise processed.

Although the technology described herein has been described above primarily with reference to the processing of a single render output, e.g. frame to be displayed, in an embodiment the technology described herein is applied to plural render outputs, e.g. frames to be displayed, and in an embodiment to a sequence of render outputs, such as frames to be displayed. In this case, in an embodiment, some or all of the data entries generated for a render output are saved for use with a subsequent render output (e.g. frame). In an embodiment the process then operates to identify whether there are identical groups of primitives (e.g. draw calls) in a subsequent render output, and if so, in an embodiment the stored data from the preceding render output is reused for such an identical group of primitives, e.g. draw call.

In an embodiment the per-group, per-collection of groups and per-grouping of collections of groups of primitives data entries store data that will allow a new depth range and covered area to be estimated for groups of primitives (e.g. draw calls) that are similar between render outputs (e.g. frames).

Similar groups of primitives, e.g. draw calls, can be identified as desired. In an embodiment when an, e.g. draw call is made, the state and parameters for that draw call are compared to the draw calls of a previous frame, and if an adequately similar draw call existed in the previous frame, the per-group, per-collection of primitive groups and per-grouping of collections of groups data entries are then interpolated from the data entries for the previous frame.

In an embodiment the data entries of an, e.g. draw call, are estimated from the previous frame if it can be determined that the, e.g. draw call in the current frame is related to a draw call in the previous frame by an affine transform (in the x, y, z, w coordinate space).

This may make it possible to reduce or even avoid the data entry generation process for groups of primitives, such as draw calls, etc., in succeeding frames.

Thus, in an embodiment, the data entries generated for a given render output, e.g. frame, are stored for possible reuse (either in whole or in part) for a subsequent render output, e.g. frame. Correspondingly, in an embodiment when a given render output, e.g. frame, is being processed, it is determined whether any stored data entries from a preceding render output (e.g. frame) can be reused (either in whole or in part) when generating the data entries for and/or when processing the current frame.

It should be noted here that although references herein to "primitives" are primarily intended to refer to graphics primitives in the form of "simple" polygons such as triangles, grids, lines or points, etc., as is known in the art (and, in an embodiment, do refer to graphics primitives in the form of "simple" polygons such as triangles, quads, lines or points), the technology described herein is also applicable to larger graphics objects or primitives, such as graphics components or primitives that are intended to represent larger objects in the scene and/or groups of smaller polygons (such as a group of contiguous triangles). For example, it may be desired to process and sort a group of plural individual polygons as a single graphical object or primitive. Such larger, "complex" primitives ("meta-primitives") can equally be listed for render target sub-regions in the manner of the technology described herein. Thus references herein to "primitives", etc., should, unless the context otherwise requires, be interpreted accordingly.

In some embodiments, the processing circuitry may be in communication with one or more memories and/or memory devices that store the data and/or data entries described herein, and/or store software for performing the processes described herein. The processing circuitry may also be in communication with a host microprocessor, and/or with a display for displaying images based on the data and/or data entries described above, and/or with a graphics processor for processing the data and/or data entries described above.

The technology described herein is applicable to any form or configuration of graphics processor and renderer, such as renderers having a "pipelined" arrangement (in which case the renderer will be in the form of a rendering pipeline).

The technology described herein accordingly extends to a graphics processor and a graphics processing platform including the apparatus of, or operated in accordance with the method of, any one or more of the embodiments of the technology described herein. Subject to any hardware necessary to carry out the specific functions discussed above, such a graphics processor can otherwise include any one or more or all of the usual functional units, etc., that graphics processors include.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements or processing circuitry and/or programmable hardware elements or processing circuitry that can be programmed to operate in the desired manner.

The various functional elements may be separate to each other or may share circuitry (e.g. be performed by the same processor and/or processing circuitry) as desired.

In one embodiment the apparatus of the technology described herein comprises dedicated (non-programmable) processing circuitry configured to operate in the manner described. In another embodiment, it comprises programmable processing circuitry that is programmed to operate in the manner described.

In an embodiment the functions of the technology described herein are carried out on a single graphics processing platform that generates and outputs the graphics data that is written as the render output (e.g. to the frame buffer for a display device).

In some embodiments, the data processing system, graphics processing system, data processors, graphics processors, processing circuitry, apparatus, etc., of the technology described herein may be in communication with memory and/or one or more memory devices that store the data described herein, such as the primitive data, the data entries, etc., and/or that store software for performing the processes described herein. The data processing system, graphics processing system, data processors, graphics processors, processing circuitry, apparatus, etc., may also be in communication with a display for displaying images based on the data entries, etc.

It should also be noted here that, as will be appreciated by those skilled in the art, the various functions, etc., of the technology described herein may be duplicated and/or carried out in parallel on a given processor. There may be, for example, plural tiling units operating in parallel.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

As will be described below, in an embodiment of the tile-based graphics processing system of the technology described herein, for a frame to be rendered, the scene to be displayed is first split up into a plurality of primitives. These primitives are defined in three dimensional "user" space and then transformed into two dimensional "screen" space. To render the primitives, the plurality of primitives in the scene are organised into "draw calls" each containing one or more primitives which, for example, are to be processed in the same manner, e.g. using the same shaders (shading programs).

Each draw call is processed separately, with the primitives being rendered per tile, with the tiles being grouped together for the final output, e.g. to display the frame. As will be described, in an embodiment of the technology described herein, a series of data entries are created for each of the primitives, for each of groups of primitives and for each draw call, which aid the efficient rendering of the primitives.

Figure 4:
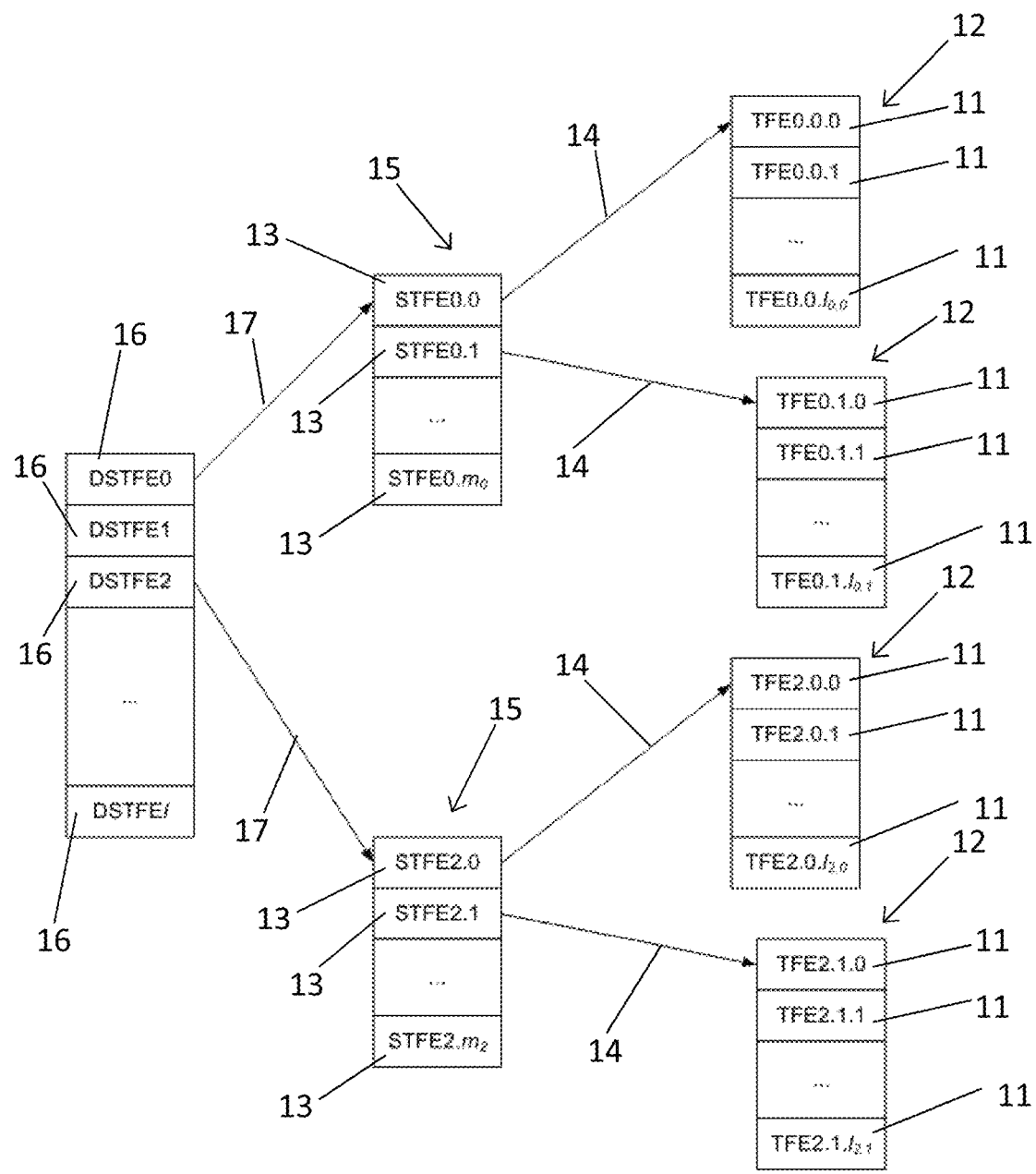
FIG. 4 is a schematic diagram showing the layout of the data entries used in an embodiment of the technology described herein.
Figure 5:
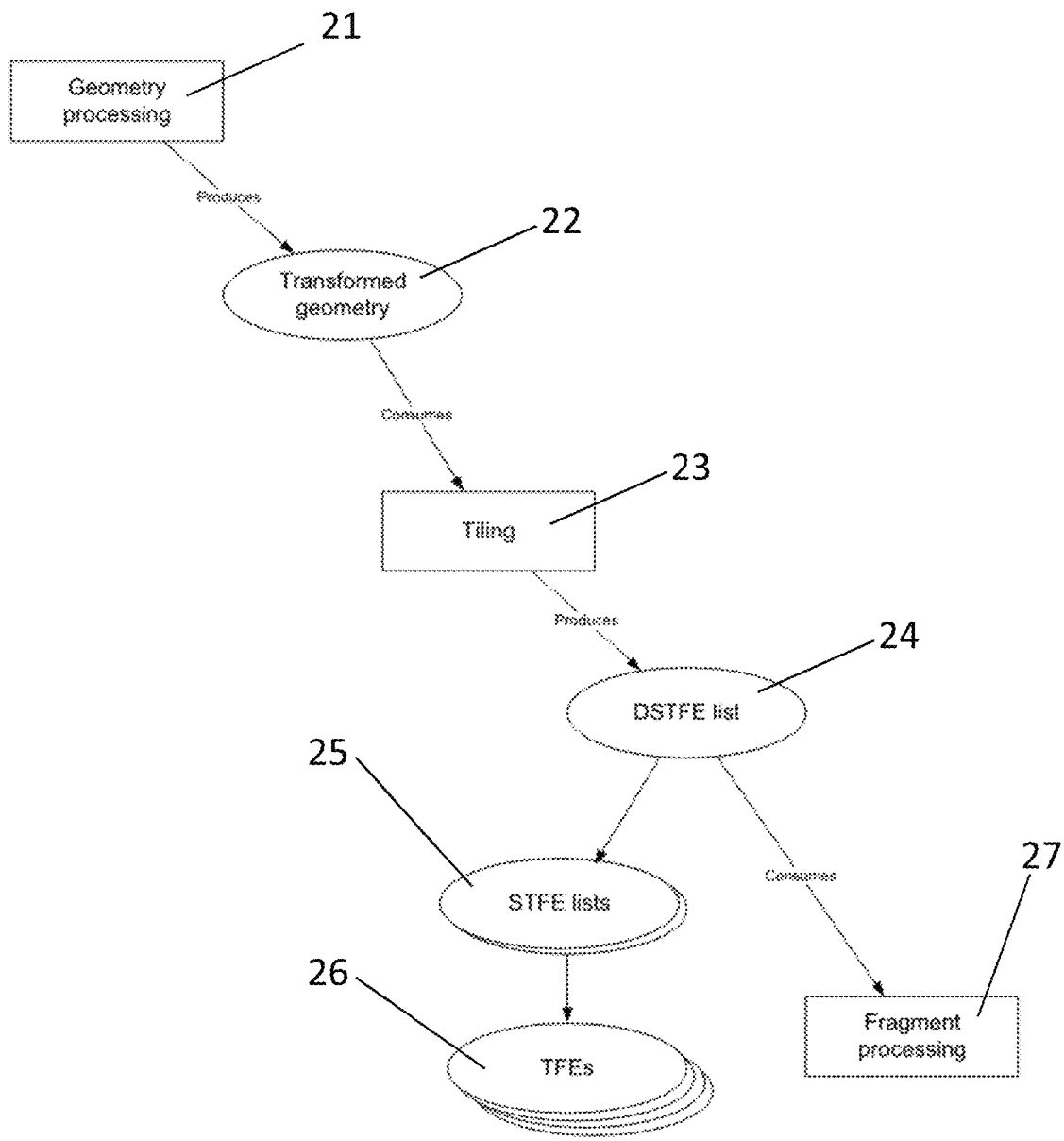
FIG. 5 is a flow chart which shows some of the main steps performed in a graphics processing system in accordance with an embodiment of the technology described herein to render a frame.

FIG. 4 is a schematic diagram showing the layout of the data entries used in an embodiment of the technology described herein. For each primitive for a given render output to be generated, such as a frame for display, a per-primitive data or tile filter entry (TFE) 11 is created and stored. Each TFE 11 contains a mapping of the primitive to the tiles it covers, stored as a bitmap of the tiles to draw the primitive in, and the depth (Z) range of the primitive in screen space.

The TFEs 11 are grouped together into a group 12 and (optionally) ordered by the depth of the corresponding primitives within the group 12. The grouping of the primitives is determined by their location in screen space (or other suitable criteria), as will be discussed further below. For each group 12 a per-group, data or summary tile filter entry (STFE) 13 is created and stored.

The STFE 13, contains a pointer 14 to the first TFE 11 in the group 12 of primitives covered by the STFE 13, a mapping of the group of primitives 12 to the tiles it covers, stored as a bitmap of the tiles to draw the group 12 in, the depth (Z) range of the group 12 in screen space (i.e. similar to the information stored in each TFE 11), the number of TFEs 11 in the group 12 and the index, in the list of primitives in the draw call which includes the group of primitives covered by the STFE 13, of the primitive corresponding to the first TFE 11 in the group 12.

In a similar manner, the STFEs 13 are grouped together into a collection of groups 15 which corresponds to all the primitives in a draw call. For each collection of primitive groups 15 a third, per-collection of primitive groups, data or draw call summary tile filter entry (DSTFE) 16 is created and stored.

The DSTFE 16, contains a pointer 17 to the first STFE 13 in the group 15 of STFEs 13 covered by the DSTFE 16, a mapping of the collection of groups of primitives 15 to the tiles it covers, stored as a bitmap of the tiles (or other suitable format, e.g. a bounding box) to draw the collection 15 in, and the depth (Z) range of the collection 15 in screen space (i.e. similar to the information stored in each TFE 11 and STFE 13).

It can be seen from FIG. 4 that the TFEs 11, STFEs 13 and DSTFEs 16 are stored in a hierarchical tree structure. The DSTFEs 16 are at the highest level in the hierarchy, with the STFEs 13 branching off the DSTFEs 16. The STFEs 13 branching off a given DSTFE 16 relate to the groups 12 of primitives in the respective collection 15 of groups of primitives described by the DSTFE 16. At the lowest level in the hierarchy are the TFEs 11, which branch off the STFEs 13. The TFEs 11 branching off a given STFE 13 relate to the primitives in the group 12 of primitives described by the STFE 13.

Figure 6:
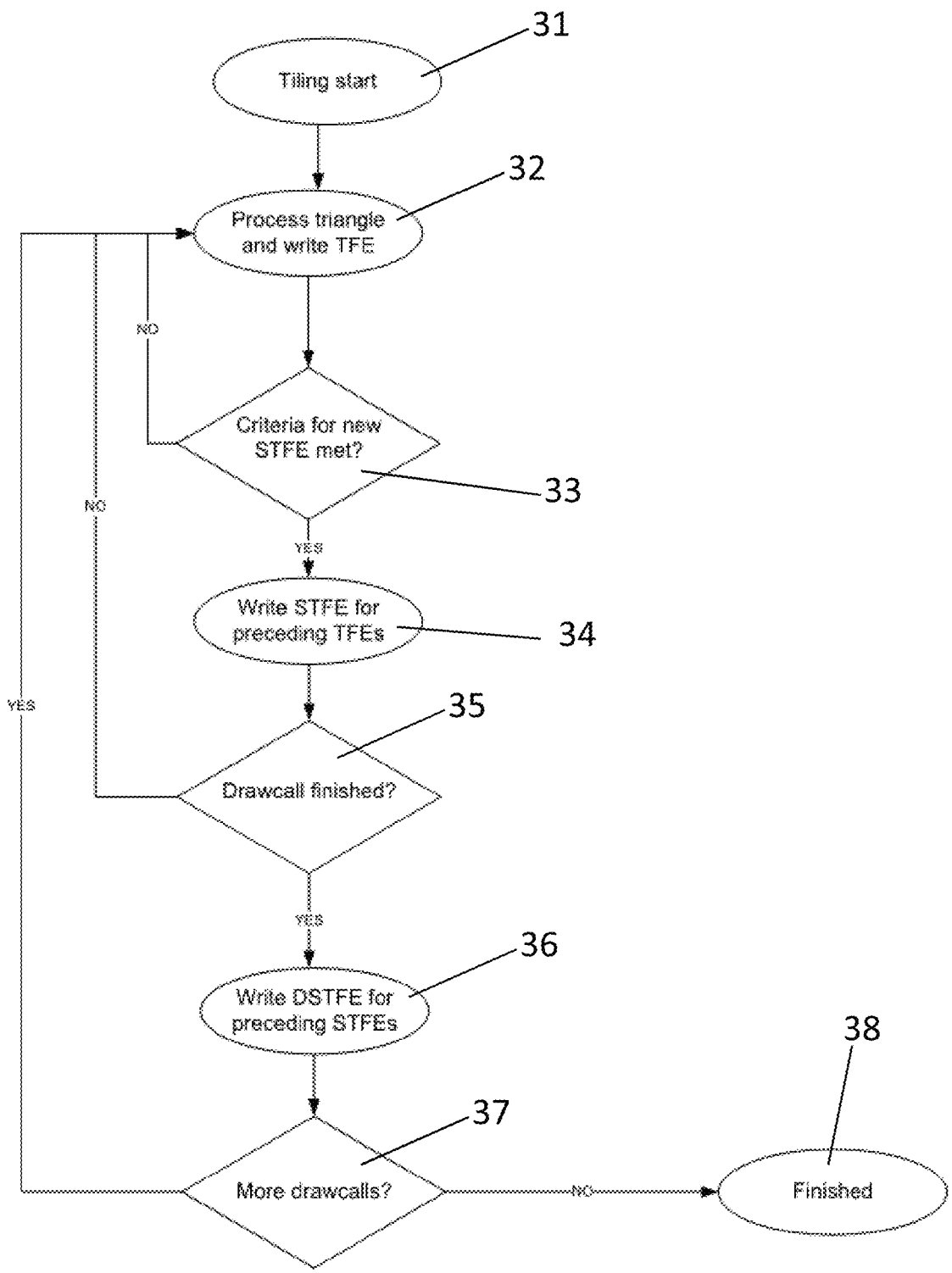
FIG. 6 is a flow chart which shows the steps performed when creating the data entries used in an embodiment of the technology described herein.

FIG. 6 is a flow chart which shows some of the main steps performed in a graphics processing system in accordance with an embodiment of the technology described herein to render a frame. First the primitives for the frame defined in a three dimensional "user" space are transformed into a two dimensional "screen" space, i.e. from the viewpoint of the viewer of the display (step 21, "Geometry processing") to generate a set of transformed primitives (step 22, "Transformed geometry").

Next comes a tiling step 23, which produces a list of DSTFEs 24, STFEs 25 and TFEs 26, as described above with reference to FIG. 4 for the transformed geometry (the process of producing the DSTFEs, STFEs and TFEs will be described below with reference to FIG. 7). The tiling stage is distributed over the compute cores of a graphics processing unit (GPU) which ensures the scalability of the tiling process with the GPU's performance. The lists of DSTFEs, STFEs and TFEs are then used to render the primitives for each tile (step 27, "Fragment processing").

Figure 7:
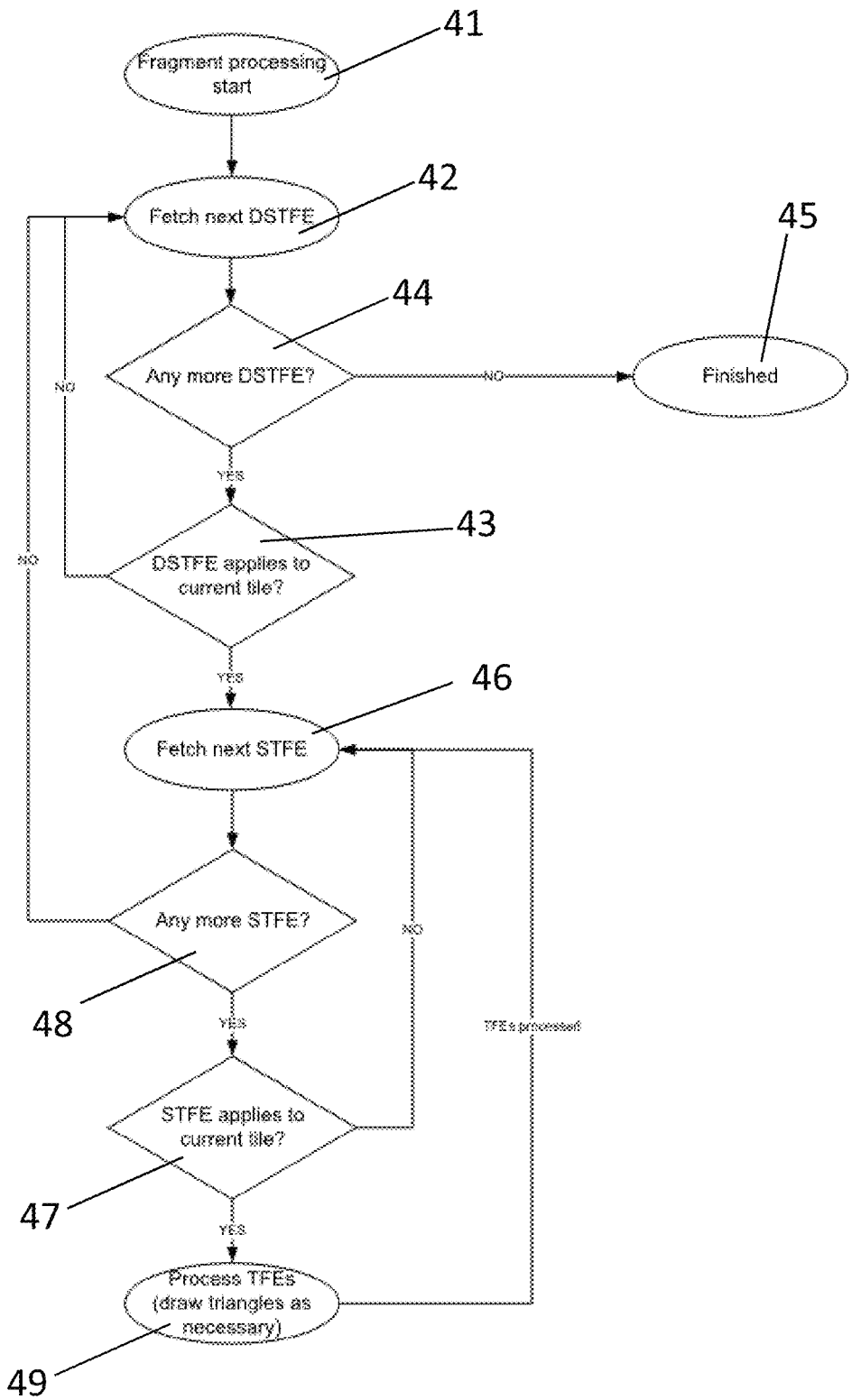
FIG. 7 is a flow chart which shows the steps performed when using the data entries in an embodiment of the technology described herein.

FIG. 7 is a flow chart which shows the steps performed when creating the data entries (the TFEs, STFEs and DSTFEs) used in an embodiment of the technology described herein. The production of the TFEs, STFEs and DSTFEs (as shown in FIG. 4 and referred to in the tiling step 23 of FIG. 6) will now be described with reference to FIG. 7.

Following the start of the tiling (step 31, FIG. 7), for the first draw call in the list of draw calls for a frame, the list of primitives (triangles) for the draw call is received. Each primitive is processed, and a corresponding TFE 11 is produced and written out to a buffer (step 32, FIG. 7). The production of each TFE 11 includes determining the tiles for which the primitive will need to be drawn to display the primitive referred to by the TFE 11 (i.e. a mapping of the primitive to the tiles). This is stored in the TFE 11 as a bitmap of the tiles to draw the primitive in. The depth (Z) range of the primitive in screen space is also (optionally) stored in the TFE 11.

After each TFE 11 has been written out, the next primitive is processed in the draw call list, first determining whether it should be included in the STFE 13 containing the previous primitive or whether a new STFE 13 should be created (step 33, FIG. 7). To assess whether a primitive should be included in the existing STFE 13 or a new STFE 13 needs to be created, the difference in attribute values such as the depth and/or location of the primitive with the previous primitive are calculated and if these are greater than a threshold value the new STFE 13 is created; otherwise the primitive is added to the existing STFE 13. If the primitive should be included in the STFE 13 with the previous primitive then step 32 is repeated and the information for the primitive is determined and stored as a TFE 11 for that primitive.

If a new STFE 13 is to be created (or the end of the list of the primitives in the draw call has been reached) the STFE 13 for the primitives in the group of primitives processed up to this point is created and stored (step 34, FIG. 7). The production of the STFE 13 includes determining a representation of the tiles for which at least one primitive of the group of primitives will need to be drawn to display the group of primitives 12 referred to by the STFE 13 (i.e. a mapping of the group of primitives to the tiles). This is stored in the STFE 11 as a bitmap of the tiles to draw the group of primitives in. The depth (Z) range of the group of primitives in screen space is also determined and stored in the STFE 13, along with a pointer 14 to the first TFE 11 in the group of TFEs for the group 12 of primitives, the number of TFEs 11 in the group 12 and the index, in the list of primitives in the draw call which includes the group of primitives covered by the STFE 13, of the primitive corresponding to the first TFE 11 in the group 12.

Once the STFE 13 has been written out, it is determined whether or not the end of the list of primitives in the draw call has been reached (step 35, FIG. 7). If not, the production of the next STFE 13 is commenced, starting with step 32 being performed for the first primitive in the new STFE 13. If the draw call has finished, a DSTFE 16 for the groups of primitives processed up to this point is created and stored (step 36, FIG. 7).

The production of the DSTFE 16 includes determining a representation of the tiles for which at least one primitive of the draw call will need to be drawn to display the collection of groups of primitives 15 referred to by the DSTFE 16 (i.e. a mapping of the draw call to the tiles). This is stored in the DSTFE 16 as a bitmap of the tiles to draw the draw call in. The depth (Z) range of the collection 15 of groups of primitives in screen space is also determined and written out in the DSTFE 16, along with a pointer 17 to the first STFE 13 in the group 15 of STFEs 13 covered by the DSTFE 16.

Once the DSTFE 16 has been written out, it is determined whether or not there are further draw calls for the frame being produced (step 37, FIG. 7). If so, the production of the next DSTFE 16 (and thus also STFE 13) is commenced, starting with step 32 being performed for the first primitive in the new DSTFE 16. If there are no further draw calls, the production of the TFEs, STFEs and DSTFEs for the frame is complete and the production of these data entries is finished (step 38, FIG. 7).

Once the information has been written out into the TFEs 11 and STFEs 13, the TFEs 11 and STFEs 13 are re-ordered so that the subsequent rendering order of the primitives is more efficient. For each STFE 13, the TFEs 11 to which it refers are re-ordered according to the depth (Z) ranges of the respective primitives stored in the TFEs 11. The TFE 11 for the primitive which is closest in screen space is placed first in the list to be subsequently processed, with the other TFEs 11 in the STFE 13 being placed in order of increasing depth in screen space. Thus, for example, for the STFE 13 labelled STFE 0.0 in FIG. 4, the TFE 11 for the primitive which is determined to be closest in screen space is ordered as the TFE 11 labelled TFE0.0.0, with the TFEs 11 for the primitives which are increasingly further away in screen space being ordered as the TFEs 11 labelled TFE0.0.1, . . . , TFE0.0.1$_{0.0}$.

Once the TFEs 11 have been re-ordered, the information in the TFEs 11 (the bitmaps of the tiles to draw the respective primitives in and the depth (Z) ranges of the respective primitives in screen space) is first quantised and then stored as the difference relative to the corresponding information stored in the previous TFE 11 (apart from the first TFE 11 in the STFE 13 for which the full information is stored). Thus, in all but the first TFE 11, the re-ordered TFEs 11 contain the bitmaps of the tiles to draw the respective primitives in and the depth (Z) ranges of the respective primitives in screen space stored as the difference relative to the corresponding information stored in the previous TFE 11.

Furthermore, once the differences in the information contained in the TFEs 11 have been determined, the information is encoded and stored in a compressed form.

In a similar manner, for each DSTFE 16, the STFEs 13 to which it refers are re-ordered according to the depth (Z) ranges of the respective groups of primitives stored in the STFEs 13. The STFE 13 for the group 12 of primitives which is closest in screen space is placed first in the list to be subsequently processed, with the other STFEs 13 in the DSTFE 16 being placed in order of increasing depth in screen space. Thus, for example, for the DSTFE 16 labelled DSTFE 0 in FIG. 4, the STFE 13 for the group 12 of primitives which is determined to be closest in screen space is ordered as the STFE 13 labelled STFE0.0, with the STFEs 13 for the groups 12 of primitives which are increasingly further away in screen space being ordered as the STFEs 13 labelled STFE0.1, . . . , STFE0.m$_0$.

Again, in a similar manner to the TFEs 11, once the STFEs 13 have been re-ordered, the information in the STFEs 13 (the bitmap of the tiles to draw the group of primitives in, the depth (Z) range of the group 12 of primitives in screen space, and the number of TFEs 11 in the group 12) is first quantised and then stored as the difference relative to the corresponding information stored in the previous STFE 13 (apart from the first STFE 13 in the DSTFE 16 for which the full information is stored). Thus, in all but the first STFE 13, the re-ordered STFEs 13 contain their pieces of information stored as the difference relative to the corresponding pieces of information stored in the previous STFE 13.

In order to render the frame, the lists of DSTFEs, STFEs and TFEs are used to determine the primitives to process for each tile that the frame is divided into for rendering purposes (step 27, FIG. 6, "Fragment processing").

Figure 8:
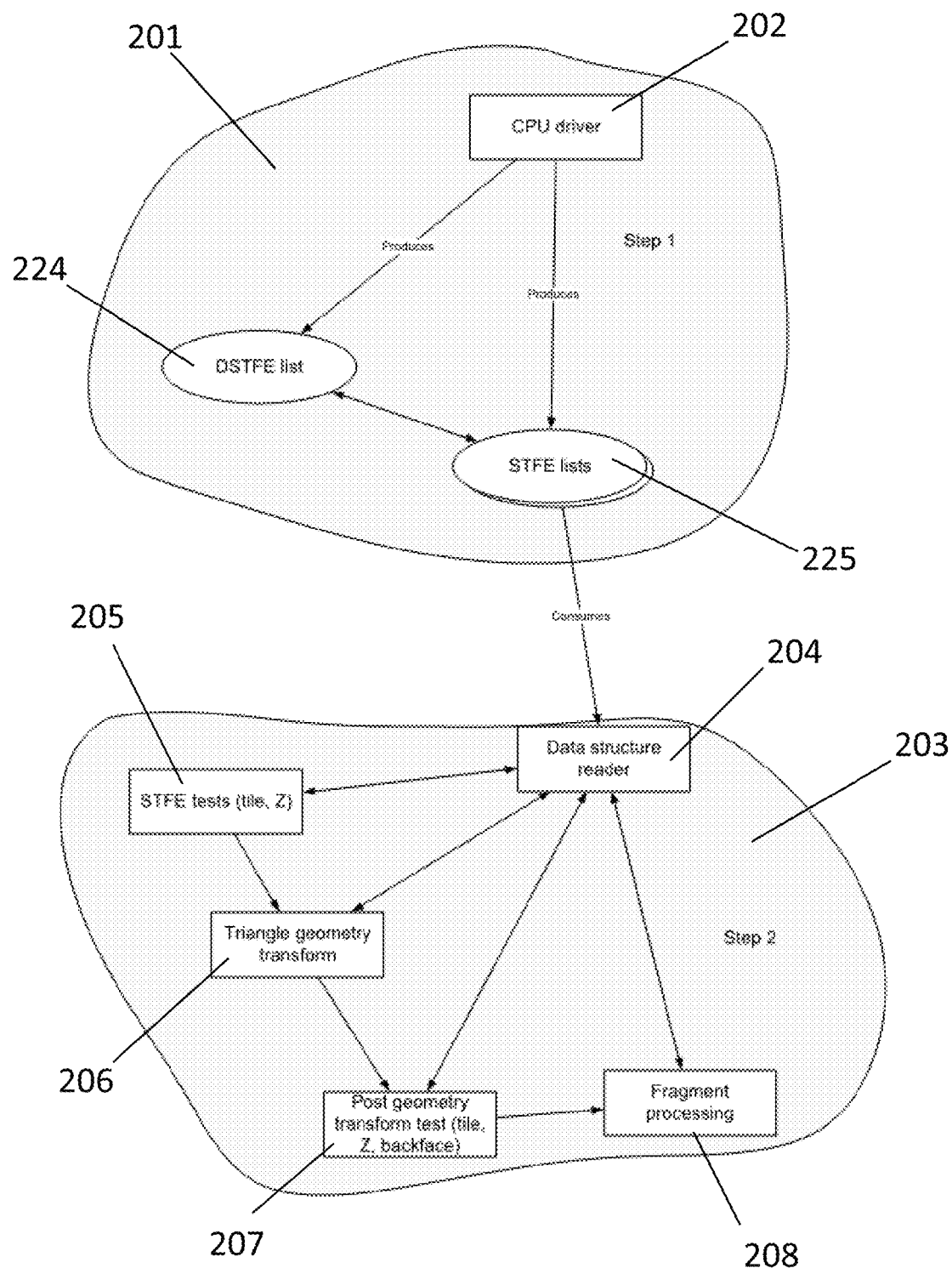
FIG. 8 is a flow chart which shows some of the main steps performed in a graphics processing system in accordance with another embodiment of technology described herein to render a frame.

This process will now be described with reference to FIGS. 4 and 8. FIG. 8 is a flow chart which shows the steps performed when using the data entries (the TFEs, STFEs and DSTFEs) to render a frame in an embodiment of the technology described herein.

FIG. 8 shows the process for a given rendering tile of the frame being generated. This operation is repeated for each tile of the frame.

For each tile, at the start of the rendering process (step 41, FIG. 8), the first DSTFE 16 (DSTFE0 as shown in FIG. 4) is fetched from the buffer (step 42, FIG. 8) and it is determined, by referring to the bitmap of the tiles stored for the DSTFE 16, whether or not the collection 15 of groups of primitives for the draw call corresponding to the DSTFE 16 covers the current tile (step 43, FIG. 8). If not, the next DSTFE 16 (DSTFE1, FIG. 4) is fetched (thus repeating step 42), unless there are no more DSFTEs 16 (step 44, FIG. 8), i.e. there are no more draw calls for the frame to be considered, in which case the rendering of the tile is finished (step 45, FIG. 8).

If the DSTFE 16 does cover the current tile, the pointer 17 in the DSTFE 16 is followed to fetch the first STFE 13 (STFE0.0, FIG. 4) for the draw call (step 46, FIG. 8) and it is determined, by referring to the bitmap of the tiles the group of primitives 12 covers in the STFE 13, whether or not the group of primitives 12 corresponding to the STFE 13 covers the current tile (step 47, FIG. 8). If not, the next STFE 13 (STFE0.1, FIG. 4) is fetched (thus repeating step 46), unless there are no more STFEs 13 (step 48, FIG. 8), i.e. the draw call is complete, in which case the next DSTFE 16 (DSTFE1, FIG. 4) is fetched (thus repeating step 42) (unless of course there are no more DSFTEs 16 (step 44, FIG. 8), and the rendering of the tile is therefore finished (step 45, FIG. 8)).

If the STFE 13 does cover the current tile, the pointer 14 in the STFE 13 is followed to fetch the first and subsequent TFEs 11 (TFE0.0.0, TFE0.0.1, . . . , TFE0.0.1$_{0.0}$, FIG. 4) for the primitives in the group of primitives the STFE 13 relates to in order to render the primitives for the tile (step 49, FIG. 8). This therefore involves querying, by reference to the bitmap of the tiles each primitive covers stored in the primitive's TFE, whether or not the primitive corresponding to each TFE 11 covers the tile, with only the primitives that cover the tile in question being rendered.

In order to render the primitives for a given tile, a rendering processor takes, as is known in the art, the transformed primitives and rasterises and renders the primitives to generate output graphics fragment (sampling point) data for each respective sampling position within the tile of the frame that they are processing. To this end, the rendering processor includes a rasterising unit, rendering unit and set of tile buffers (not shown), which operate in the usual manner for such units in graphics processing systems.

Thus the rasterising unit of the rendering processor will take as its input the selected primitives and their vertices, rasterise the primitives to graphics fragments, and provide those fragments to the rendering unit of the respective rendering processor. The rendering unit will then perform a number of rendering processes, such as texture mapping, blending, shading, etc., on the fragments, and generate rendered fragment data which it stores in a tile buffer or buffers of the rendering processor for providing to a frame buffer for a display. Once the rendering processor has completed its processing of a given tile, the stored, rendered tile data is output from the tile buffer(s) to the frame buffer for a display.

As discussed above, in the tile-based graphics processing system of the technology described herein, the render output (e.g. frame to be rendered) is rendered as plural individual rendering tiles. Thus the rendering processor operates on one respective rendering tile of the render output at any given time, and once it has completed the processing of its current tile, writes the rendered output for that tile to the frame buffer, and then moves on to processing another tile of the render output and so on.

Once all the TFEs 11 for the STFE 13 have been processed, the next STFE 13 (STFE0.1, FIG. 4) is fetched (thus repeating step 46), unless there are no more STFEs 13 (step 48, FIG. 8), i.e. the draw call is complete, in which case the next DSTFE 16 (DSTFE1, FIG. 4) is fetched (thus repeating step 42) (unless of course there are no more DSFTEs 16 (step 44, FIG. 8), and the rendering of the tile is therefore finished (step 45, FIG. 8)).

This is then repeated for the next tile, and so on, until all the tiles for the frame have been rendered. Thus for each tile, the hierarchical tree of the DSTFEs 16, STFEs 13 and TFEs 11 is traversed in order to determine which primitives are required to be rendered for a that tile.

Another embodiment of a graphics processing system will now be described with reference to FIG. 8. In this embodiment the geometry of the individual primitives is not transformed from user space to screen space before the data entries are prepared and stored, i.e. compared to the previous embodiment in which the geometry is transformed prior to the tiling step. In this embodiment the geometry of the individual primitives is transformed after the data entries have been prepared and stored.

FIG. 8 is a flow chart which shows some of the main steps performed in a graphics processing system, in accordance with this embodiment of the technology described herein, to render a frame. In a first step 201 of this embodiment, a driver 202 running on a CPU of the system produces a list of DSTFEs 224 and STFEs 225 using the primitives defined for the frame. This is done in a similar manner as described above with reference to FIG. 4, except that the TFE data entries for the individual primitives are not produced.

The STFEs 225 and the DSTFEs 224 are produced using a limited amount of transformed geometry, i.e. in a two dimensional "screen" space, such as a bounding box for the group of primitives described by each of the STFEs 225 and for the collection of groups of primitives described by each of the DSTFEs 224. The process of producing the DSTFEs 224 and STFEs 225 in this embodiment is similar to that described above with reference to FIG. 6.

Once the lists of DSTFEs 224 and STFEs 225 have been produced, they are written to a buffer from where they can be used in a second step 203, the processing of which is distributed over the compute cores of a graphics processing unit (GPU). As an intermediate step between the first step 201 and the second step 203, as described for the embodiment above with reference to FIG. 6, the STFEs 225 may be re-ordered, e.g. in order of increasing depth in screen space.

In the second step 203, the lists of DSTFEs 224 and STFEs 225 are used to render the primitives for each tile, in a similar process as described for the above embodiment with reference to FIG. 7. As with the process described with reference to FIG. 7, the process for this embodiment will be described for a given rendering tile of the frame being generated. This operation is repeated for each tile of the frame.

First the lists of DSTFEs 224 and STFEs 225 are read in by a "data structure reader" 204 from the buffer. This allows the data entries of the DSTFEs 224 and STFEs 225 to be used in a number of different processing stages that result in the rendering of the primitives, as will now be described.

For each DSTFE 224, it is determined, by referring to the bounding box of the tiles stored for the DSTFE 224, whether or not the collection of groups of primitives for the draw call corresponding to the DSTFE 224 covers the current tile. If not, the next DSFTE 224 is fetched and considered, unless there are no more DSTFEs 224.

If the DSTFE 224 does cover the current tile, the first STFE 225 for the draw call related to the DSTFE 224 is used to determine, by referring to the bounding box of the tiles the group of primitives covers in the STFE 225, whether or not the group of primitives corresponding to the STFE 225 covers the current tile (step 205, FIG. 8). If not, the next STFE 225 is fetched, unless there are no more STFEs 225. An early depth (Z) test may also be performed using the depth (Z) information stored in the STFE 225 to determine if the group of primitives is completely covered by other primitives (step 205, FIG. 8). If the group of primitives is completely covered, and thus does not need to be processed further, the next STFE 225 is fetched.

If the STFE 225 does cover the current tile and is not completely covered by other primitives, the geometry of each of the individual primitives in the group of primitives the STFE 225 relates to is transformed from user space to screen space (step 206, FIG. 8).

The transformed geometry of the individual primitives can then be used to determine whether or not they should be rendered (step 207, FIG. 8). This may involve one or more tests performed on the transformed geometry of each primitive to determine if they will be visible in the final render output, including whether or not the primitive at least partially covers the current tile, a depth test (i.e. is the primitive fully covered by other primitives) and/or a back-face culling test (i.e. is the primitive facing backwards in screen space) (step 207, FIG. 8).

Once it has been determined which primitives are to be processed for the tile in question, these primitives are then rendered for the tile (step 208, FIG. 8, "Fragment processing").

Another embodiment of a graphics processing system will now be described with reference to FIG. 9. This embodiment is similar to that described with reference to FIG. 8, with the addition of a tiling stage (a "geometry pre-processor") before the production of at least some of the data entries.

This allows data entries (TFEs) for the individual primitives to be produced, as will be described. However, similar to the embodiment described with reference to FIG. 8, in this embodiment the geometry of the individual primitives is not transformed from user space to screen space before the data entries are prepared and stored.

Figure 9:
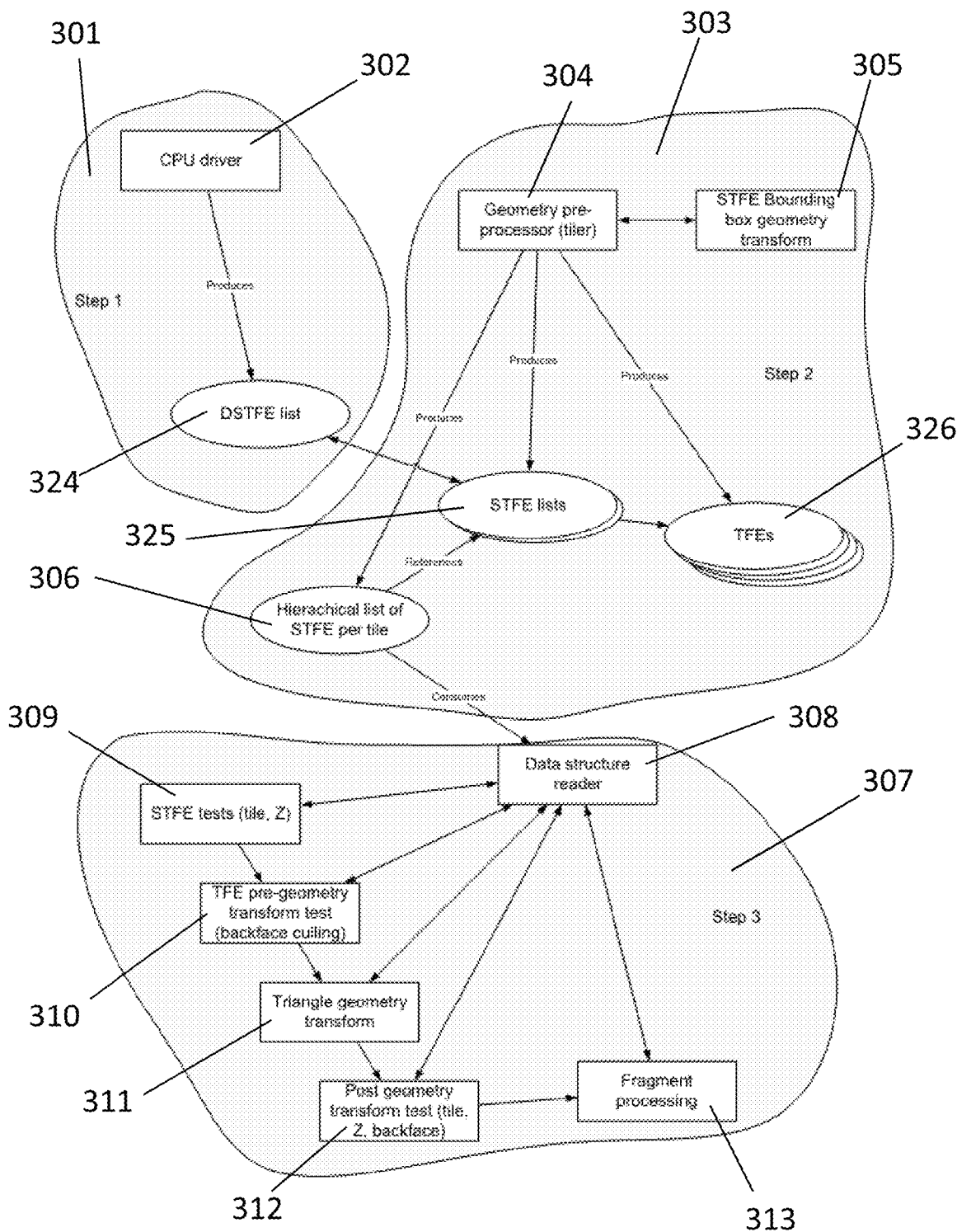
FIG. 9 is a flow chart which shows some of the main steps performed in a graphics processing system in accordance with a further embodiment of the technology described herein to render a frame.

FIG. 9 is a flow chart which shows some of the main steps performed in a graphics processing system, in accordance with this embodiment of the technology described herein, to render a frame. In a first step 301 of this embodiment, a driver 302 running on the CPU produces a list of DSTFEs 324 using the primitives defined for the frame. This is in a similar manner as described above with reference to FIG. 4.

In a second step 303, a tiling stage (a "geometry pre-processor") 304 is used to transform a limited amount of the geometry of the primitives, e.g. the bounding box 305 for the group of primitives, such that the STFEs 325 can be produced. At this step 303 the TFEs 326 are also produced for the individual primitives, but not using the fully transformed geometry, as this is not available at this stage.

The process of producing the DSTFEs 324, STFEs 325 and TFEs 326 in this embodiment is similar to that described above with reference to FIG. 6, except that for the TFEs 326 a bitmap of the tiles to draw the primitive in is not created and stored. This is because, with the limited transformed geometry available at this stage, this information is not able to be determined. Instead, a binned value of the normal direction of the primitive is stored in each TFE 326. In this embodiment the determination as to whether to include a further primitive in an existing STFE 325 may therefore be made based on the difference in normal values from one primitive to the next primitive being considered.

The tiling stage 304 also produces, using the list of STFEs 325, a (in an embodiment re-ordered) list 306 of the STFE entries for a tile, e.g. in order of increasing depth (Z). In an embodiment the list is hierarchical, in that it comprises lists for increasingly larger groups of tiles, e.g. a first list for each individual tile, a second list for a group of tiles (e.g. four neighbouring tiles) and a third list for a larger group of tiles (e.g. sixteen neighbouring tiles), and so on up to a group of tiles which is the same size or larger than the whole screen.

In an embodiment each STFE entry is inserted into a list which is common for the tiles the STFE spans (an optimal list), if the STFE applies to multiple tiles. However the STFE entries may be inserted into multiple lists, e.g. if the STFE only spans two tiles, but the arrangement of the hierarchical structure means adding the STFE entry into a list several levels above this.

Once the lists of DSTFEs 324, STFEs 325 and TFEs 326 have been produced, they are written to a buffer from where they can be used in a third step 307, the processing of which is distributed over the compute cores of a graphics processing unit (GPU). In the third step 307, the lists of DSTFEs 324, STFEs 325 and TFEs 326 are used to render the primitives for each tile, in a similar process as described for the above embodiment with reference to FIG. 7. As with the process described with reference to FIG. 7, the process for this embodiment will be described for a given rendering tile of the frame being generated. This operation is repeated for each tile of the frame. However if a hierarchical list of the STFE entries has been prepared, this may be used to limit the number of STFEs 325 which are read for each tile. Using the hierarchical list of STFEs for rendering is possible because each STFE 325 may contain a back reference to the DSTFE 324 containing the context for processing the STFE 325, making it unnecessary to walk through each DSTFE and the related STFEs in order.

First the lists of DSTFEs 324, STFEs 325 and TFEs 326 are read in by a "data structure reader" 308 from the buffer. This allows the data entries of the DSTFEs 324, STFEs 325 and TFEs 326 to be used in a number of different processing stages that result in the rendering of the primitives, as will now be described.

For each DSTFE 324, it is determined, by referring to the bounding box of the tiles stored for the DSTFE 324, whether or not the collection of groups of primitives for the draw call corresponding to the DSTFE 324 covers the current tile. If not, the next DSFTE 324 is fetched and considered, unless there are no more DSTFEs 324.

If the DSTFE 324 does cover the current tile, the first STFE 325 for the draw call related to the DSTFE 324 is used to determine, by referring to the bounding box of the tiles the group of primitives covers in the STFE 325, whether or not the group of primitives corresponding to the STFE 325 covers the current tile (step 309, FIG. 9). If not, the next STFE 325 is fetched, unless there are no more STFEs 325. An early depth (Z) test may also be performed using the depth (Z) information stored in the STFE 325 to determine if the group of primitives is completely covered by other primitives (step 309, FIG. 9). If the group of primitives is completely covered, and thus does not need to be processed further, the next STFE 325 is fetched.

If the STFE 325 does cover the current tile and is not completely covered by other primitives, each primitive in the group of primitives related to the STFE 325 is tested as to whether it is back-facing or not (step 310, FIG. 9). This is done by using the binned normal information in the TFE 326 for the primitive and the transformed bounding box for the group of primitives, i.e. as stored in the STFE 325. The primitives which are back-facing are discarded (culled) and not processed any further for the tile.

Next, the geometry of each of the individual remaining primitives (i.e. those which have not been discarded following the back-facing test) in the group of primitives the STFE 325 relates to is transformed from user space to screen space (step 311, FIG. 9). The transformed geometry of the individual primitives can then be used to determine whether or not they should be rendered (step 312, FIG. 9). This may involve one or more tests on the transformed geometry of each primitive to determine whether they will be visible in the final render output, including whether or not the primitive at least partially covers the current tile, a depth test (i.e. is the primitive fully covered by other primitives) and/or a (more detailed) back-face culling test (i.e. using the transformed geometry) (step 312, FIG. 9).

Once it has been determined which primitives are to be processed for the tile in question, these primitives are then rendered for the tile (step 313, FIG. 9, "Fragment processing").

It can be seen from the above that in at least an embodiment, a data structure, i.e. including the per-primitive and per-group data entries, to which information relating to the primitives being rendered is written, is used for rendering the primitives in a frame. By storing information relating to the primitives in a hierarchical structure, information stored at a higher level, i.e. the per-group data entry for the group of primitives, need not be duplicated multiple times at a lower level, i.e. in the per-primitive data entries for each primitive. This means that less storage space for the information relating to the primitives is needed, and also less bandwidth is needed in the system to process this information during rendering.

Furthermore, the grouping of the information in the per-group data entries allows the rendering of the primitives to be optimised. This is because the information in the per-group data entries is a summary, held at a higher level, of the plurality of primitives in the group of primitives, which can be used to more efficiently process the primitives.

Thus it will be appreciated that the technology described herein comprises methods and apparatus for the creation of data structures which allow the rendering of a plurality of primitives to be performed more efficiently, and which can be used to accelerate downstream stages of the rendering pipeline.

The technology described herein can comprise a hierarchical compressed description of geometry in a render output (e.g. frame) to be generated that can be efficiently traversed. The data structures of the technology described herein can also facilitate accelerating the process of finding intersections between rays and primitives when performing ray-tracing.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of processing primitives in a tile-based graphics processing system, the method comprising:
    for a group of plural primitives to be rendered:
        determining, for the group of primitives, the rendering tiles that the group of primitives should be processed for;
        storing, for the group of primitives, a data entry comprising an indication of the identity of the plurality of primitives in the group of primitives, and an indication of the rendering tiles that it has been determined the group of primitives should be processed for; and
    for a collection of plural groups of plural primitives to be rendered:
        storing, for the collection of groups of primitives, a data entry comprising an indication of the identity of the plurality of primitives in the collection of groups of primitives, and an indication of the rendering tiles that the collection of the groups of primitives extends over.

2. A method as claimed in claim 1, comprising:
    storing, for each primitive of the plurality of primitives, a data entry comprising information that can be used to determine whether to process the primitive or not.

3. A method as claimed in claim 2, wherein the information stored in the data entry for each primitive of the plurality of primitives comprises an indication of the direction the primitive is facing.

4. A method as claimed in claim 1, comprising:
    determining, for each primitive of the plurality of primitives, the rendering tiles that the primitive should be processed for; and
    storing, for each primitive of the plurality of primitives, a data entry comprising an indication of the rendering tiles that it has been determined the primitive should be processed for.

5. A method as claimed in claim 1, wherein the indication of the rendering tiles that it has been determined the primitive should be processed for and/or that the group of primitives should be processed for comprises a bounding box for the primitive or group of primitives.

6. A method as claimed in claim 1, further comprising:
    determining, for each primitive of the plurality of primitives, a depth range and/or value for the primitive, and/or storing, for each primitive of the plurality of primitives, a depth range and/or value for the primitive in the per-primitive data entry for the primitive; and/or
    determining, for the group of primitives, a depth range and/or value for the plurality of primitives, and/or storing a depth range and/or value for the group of primitives in the per-group data entry for the group of primitives.

7. A method as claimed in claim 6, further comprising using the stored depth ranges and/or values for the per-primitive data entries to determine a processing order for the primitives.

8. A method as claimed in claim 1, further comprising, encoding and storing the data entries in a compressed form.

9. A method of generating a render output in a tile-based graphics processing system, the method comprising, for each tile of the render output:
    reading a data entry for a collection of groups of primitives for the render output, which data entry comprises an indication of the identity of the groups of primitives in the collection of groups of primitives, and an indication of the rendering tiles that it has been determined the collection of groups of primitives should be processed for;
    determining, using the indication in the data entry for the collection of groups of primitives, if the collection of groups of primitives extends over the tile; and
    when the collection of groups of primitives is determined to extend over the tile:
        reading a data entry for a group of primitives in the collection of groups of primitives for the render output, which data entry comprises an indication of the identity of the plurality of primitives in the group of primitives, and an indication of the rendering tiles that it has been determined the group of primitives should be processed for;
        determining, using the indication in the data entry for the group of primitives, if the group of primitives should be processed for the tile; and
        when the group of primitives is determined to be processed for the tile:
            rendering the primitives of the plurality of primitives in the group of primitives, identified by the indication of the identity of the plurality of primitives in the data entry for the group of primitives, that fall at least partially in the tile.

10. A method as claimed in claim 9, further comprising, when the group of primitives is determined to be processed for the tile:
    for each of the plurality of primitives in the group of primitives, identified by the indication of the identity of the plurality of primitives in the data entry for the group of primitives:
        reading a data entry for that primitive, which data entry comprises information that can be used to determine whether to process the primitive for the tile or not;
        determining, using the information that can be used to determine whether to process the primitive or not in the primitive's data entry, if the primitive should be processed for the tile; and when it is determined that the primitive should be processed, rendering at least a part of the primitive that falls in the tile.

11. A method as claimed in claim 10, wherein the information that can be used to determine whether to process the primitive for the tile or not comprises normal information for the primitive, and wherein the step of determining if the primitive should be processed for the tile comprises using the normal information in conjunction with the indication, in the data entry for the group of primitives, of the rendering tiles that it has been determined the group of primitives should be processed for, to determine if the primitive is not back-facing and should be processed; and when the primitive is determined not to be back-facing, rendering at least a part of the primitive that falls in the tile.

12. An apparatus for processing primitives in a tile-based graphics processing system, the apparatus comprising processing circuitry that is capable of:

determining, for a group of plural primitives to be rendered, the rendering tiles that the group of primitives should be processed for;

storing, for the group of primitives, a data entry comprising an indication of the identity of the plurality of primitives in the group of primitives, and an indication of the rendering tiles that it has been determined the group of primitives should be processed for; and storing, for a collection of plural groups of plural primitives to be rendered, a data entry comprising an indication of the identity of the plurality of primitives in the collection of groups of primitives, and an indication of the rendering tiles that the collection of the groups of primitives extends over.

13. An apparatus as claimed in claim 12, wherein the processing circuitry is capable of:

storing, for each primitive of the plurality of primitives, a data entry comprising information that can be used to determine whether to process the primitive or not.

14. An apparatus as claimed in claim 13, wherein the information stored in the data entry for each primitive of the plurality of primitives comprises an indication of the direction the primitive is facing.

15. An apparatus as claimed in claim 12, wherein the processing circuitry is capable of:

determining, for each primitive of the plurality of primitives, the rendering tiles that the primitive should be processed for; and storing, for each primitive of the plurality of primitives, a data entry comprising an indication of the rendering tiles that it has been determined the primitive should be processed for.

16. An apparatus as claimed in claim 12, wherein the indication of the rendering tiles that it has been determined the primitive should be processed for and/or that the group of primitives should be processed for comprises a bounding box for the primitive or group of primitives.

17. An apparatus as claimed in claim 12, wherein the processing circuitry is further capable of:

determining, for each primitive of the plurality of primitives, a depth range and/or value for the primitive, and/or storing, for each primitive of the plurality of primitives, a depth range and/or value for the primitive in the per-primitive data entry for the primitive; and/or determining, for the group of primitives, a depth range and/or value for the plurality of primitives, and/or storing, a depth range and/or value for the group of primitives in the per-group data entry for the group of primitives.

18. An apparatus as claimed in claim 17, wherein the processing circuitry is capable of using the stored depth ranges and/or values for the per-primitive data entries to determine a processing order for the primitives.

19. An apparatus as claimed in claim 12, wherein the processing circuitry is capable of encoding and storing the data entries in a compressed form.

20. A tile-based graphics processing system comprising processing circuitry capable of, when generating a render output, for each tile of the render output:

reading a data entry for a collection of groups of primitives for the render output, which data entry comprises an indication of the identity of the groups of primitives in the collection of groups of primitives, and an indication of the rendering tiles that it has been determined the collection of groups of primitives should be processed for;

determining, using the indication in the data entry for the collection of groups of primitives, if the collection of groups of primitives extends over the tile; and when the collection of groups of primitives is determined to extend over the tile:

reading a data entry for a group of primitives in the collection of groups of primitives for the render output, which data entry comprises an indication of the identity of the plurality of primitives in the group of primitives, and an indication of the rendering tiles that it has been determined the group of primitives should be processed for;

determining, using the indication in the data entry for the group of primitives, if the group of primitives should be processed for the tile; and when the group of primitives is determined to be processed for the tile:

rendering the primitives of the plurality of primitives in the group of primitives, identified by the indication of the identity of the plurality of primitives in the data entry for the group of primitives, that fall at least partially in the tile.

21. A system as claimed in claim 20, wherein the processing circuitry is further capable of:

when the group of primitives is determined to be processed for the tile:

for each of the plurality of primitives in the group of primitives, identified by the indication of the identity of the plurality of primitives in the data entry for the group of primitives:

reading a data entry for that primitive, which data entry comprises information that can be used to determine whether to process the primitive for the tile or not;

determining, using the information that can be used to determine whether to process the primitive or not in the primitive's data entry, if the primitive should be processed for the tile; and when it is determined that the primitive should be processed, rendering at least a part of the primitive that falls in the tile.

22. A system as claimed in claim 21, wherein the information that can be used to determine whether to process the primitive for the tile or not comprises normal information for the primitive, and wherein the step of determining if the primitive should be processed for the tile comprises using the normal information in conjunction with the indication, in the data entry for the group of primitives, of the rendering tiles that it has been determined the group of primitives should be processed for, to determine if the primitive is not back-facing and should be processed; and wherein the processing circuitry is further capable of rendering at least a part of the primitive that falls in the tile when the primitive is determined not to be back-facing.

23. A non-transitory computer readable storage medium storing computer software code which when executing on a processor performs a method of processing primitives in a tile-based graphics processing system, the method comprising:

for a group of plural primitives to be rendered:
  determining, for the group of primitives the rendering tiles that the group of primitives should be processed for; and
  storing, for the group of primitives, a data entry comprising an indication of the identity of the plurality of primitives in the group of primitives, and an indication of the rendering tiles that it has been determined the group of primitive should be processed for; and for a collection of plural groups of plural primitives to be rendered:
  storing, for the collection of groups of primitives, a data entry comprising an indication of the identity of the plurality of primitives in the collection of groups of primitives, and an indication of the rendering tiles that the collection of the groups of primitives extends over.

* * * * *